US007715086B2

(12) United States Patent
Yamamoto et al.

(10) Patent No.: US 7,715,086 B2
(45) Date of Patent: May 11, 2010

(54) DISPLAY METHOD, AND DISPLAY MEDIUM AND DISPLAY DEVICE USING THE METHOD THEREOF

(75) Inventors: Yasuo Yamamoto, Kanagawa (JP); Jun Kawahara, Kanagawa (JP); Takayuki Takeuchi, Kanagawa (JP); Hiroaki Moriyama, Kanagawa (JP); Rie Ishii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1078 days.

(21) Appl. No.: 11/392,287

(22) Filed: Mar. 29, 2006

(65) Prior Publication Data

US 2006/0272948 A1 Dec. 7, 2006

(30) Foreign Application Priority Data

Jun. 3, 2005 (JP) ............................ 2005-164756
Dec. 9, 2005 (JP) ............................ 2005-356020

(51) Int. Cl.
*G02B 26/00* (2006.01)
*C09K 19/02* (2006.01)
*G09G 3/38* (2006.01)

(52) U.S. Cl. ........................ 359/296; 349/186; 345/105

(58) Field of Classification Search ......... 359/265-270, 359/272-275, 277, 245-247, 254; 345/49, 345/105; 349/182-186; 348/814; 250/70; 438/929
See application file for complete search history.

(56) References Cited

U.S. PATENT DOCUMENTS 5,054,894 A * 10/1991 Warszawski ................ 359/270
2003/0096113 A1 5/2003 Jacobson

FOREIGN PATENT DOCUMENTS

| | | |
|---|---|---|
| EP | 1244168 | 9/2002 |
| EP | 1507164 | 2/2005 |
| EP | 1510854 | 3/2005 |
| JP | 2000-338528 | 12/2000 |
| JP | 2003-131339 | 5/2003 |
| JP | 2003-170627 | 6/2003 |
| JP | 2004-018549 | 1/2004 |
| JP | 2004-198451 | 7/2004 |
| JP | 2005-092183 | 4/2005 |

* cited by examiner

*Primary Examiner*—Rick L Mack
*Assistant Examiner*—Dawayne A Pinkney
(74) *Attorney, Agent, or Firm*—Fildes & Outland, P.C.

(57) ABSTRACT

The invention provides a display method, and a display medium and a display device using the method thereof. The display method displays an image through a process for depositing fine metal particles, in which fine metal particles are deposited on a solid surface from an electrolyte by giving one stimulus to the electrolyte, wherein the particle size distribution of the fine metal particles that are deposited on the specific area of the solid surface, has one or more maximum peaks, and at least one of the maximum peaks satisfies the following formula (1):

$$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

50 Claims, 2 Drawing Sheets

DISPLAY METHOD, AND DISPLAY MEDIUM AND DISPLAY DEVICE USING THE METHOD THEREOF

CROSS-REFERENCE TO RELATED APPLICATION

This application claims priority under 35 USC 119 from Japanese Patent Application Nos. 2005-164756 and 2005-356020, the disclosures of which are incorporated by reference herein.

BACKGROUND

1. Technical Field

The present invention relates to a display method that is suitable for utilizing for an electronic paper and the like, and to a display medium and a display device using the method thereof.

2. Related Art

Along with the advancement of computerization in recent years, the amount consumed of paper as a communication medium is continuing to increase. However, as a medium for replacing paper, electronic paper, an image display medium with which recording and deleting an image can be repeated is gathering attention to. In order to put the electronic paper to use in practice, it is required that the electronic paper, as portable, lightweight and not bulky (thin) as paper, requires little energy for rewriting, and has high reliability with little deterioration with repeated rewriting.

Display technologies that are suitable for use in such a display medium include methods in which display is carried out by depositing and dissolving metals such as silver through application of electric fields or light irradiation utilizing an electrolyte like a silver salt solution (for example, Japanese Patent Application Laid-Open (JP-A) Nos. 2000-338528, 2005-92183, 2004-18549, 2004-198451, and the like), and methods in which display is carried out by utilizing organic photochromic materials such as fulgides (for example, JP-A Nos. 2003-131339 and 2003-170627).

However, when the purpose of utilizing electronic paper is considered, although monochrome display is basically the most important, the ability to display color is also important, because good visual quality and a wide array of representations are realizable.

As for color display, for example, in the methods described in JP-A Nos. 2000-338528 and 2005-92183, in which the combination of an electrolyte and applications an electric field is utilized, various kinds of color display can be carried out by utilizing color filters. In addition, in the methods described in JP-A Nos. 2004-18549 and 2004-198451, in which the combination of an electrolyte and light irradiation is utilized, color display can be carried out in principle by illuminating light having the same color as that to be displayed. In this method, a polychromatic photochromic material, which consists of titanium oxide bearing silver particles, is used and the color display is carried out by irradiating light with a predetermined wavelength onto this polychromatic photochromic material.

On the other hand, the methods using a photochromic material, as described in JP-A Nos. 2003-131339 and 2003-170627, can easily carry out color display by combining materials having different coloration properties.

However, when a color filter is used in the method described in JP-A Nos. 2000-338528 and 2005-92183, in which the combination of an electrolyte and electric field application is utilized, it is difficult to obtain high resolution. In addition, since the thickness of the display medium is also increased, it is also considered that the display medium becomes too bulky for use in place of paper media.

Further, in the methods described in JP-A Nos. 2004-18549 and 2004-198451, in which the combination of an electrolyte and light irradiation is utilized, specific color can be displayed. However, through diligent investigation the inventors have found that the method has difficulty in obtaining sufficient coloration density.

As mentioned above, in order to carry out color display by conventional methods using an electrolyte, it is necessary to use a color filter, and coloration density is insufficient.

On the other hand, the methods using a photochromic material as described in JP-A Nos. 2003-131339 and 2003-170627 are excellent in terms of ease in which color display can be carried out, however, the reliability of the methods is considered to be low in comparison with methods using an electrolyte for long-term use, because organic materials are used.

SUMMARY

The present invention has been made in view of the above circumstances and provides a display method, and a display medium and a display device using the method thereof.

According to an aspect of the present invention, a display method that displays an image through a process for depositing fine metal particles, in which the fine metal particles containing metal ions are deposited on a solid surface from an electrolyte containing the metal ions by giving one stimulus to the electrolyte, wherein:

the particle size distribution of the fine metal particles, from all of the fine metal particles deposited from the electrolyte, that are deposited on a specific area of the solid surface, has one or more maximum peaks, and at least one of the maximum peaks satisfies the following formula (1), $$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

According to another aspect of the present invention, a display method that displays an image through a process for depositing fine metal particles, wherein fine metal particles containing metal ions are deposited on a solid surface from an electrolyte containing the metal ions by giving one stimulus to the electrolyte, the solid surface has pores, and a plurality of the fine metal particles are deposited within the pores.

According to another aspect of the present invention, a display medium, the display medium comprising:

at least a pair of substrates, at least one of the substrates having transparency and the pair of substrates being arranged to be opposite to each other; and an electrolyte layer, which is sandwiched between the pair of substrates and has an electrolyte containing metal ions, wherein the display medium has at least a function that displays an image by depositing fine metal particles containing metal ions from the electrolyte at at least one location selected from one or more of the pair of substrate surfaces that are in contact with the electrolyte layer and within the electrolyte layer by giving one stimulus to at least one selected from one or more of the pair of substrates and the electrolyte layer, and further wherein the particle size distribution of the fine metal particles from all of the fine metal particles deposited from the electrolyte, that are deposited in a specific area, has one or more maximum peaks, and at least one of the maximum peaks satisfies the following formula (1), $$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

According to another aspect of the present invention, a display medium, the display medium comprising:

at least a pair of substrates, at least one of the substrates having transparency and the pair of substrates being arranged to be opposite to each other; and an electrolyte layer which is sandwiched between the pair of substrates and has an electrolyte containing metal ions, wherein the display medium has at least a function that displays an image by depositing fine metal particles containing metal ions from the electrolyte onto at least one of the pair of substrate surfaces that are in contact with the electrolyte layer by giving one stimulus to at least one selected from one or more of the one pair of substrates and the electrolyte layer, and wherein the substrate surface on which the fine metal particles are deposited has pores, and a plurality of the fine metal particles are deposited within the pores.

According to another aspect of the present invention, a display medium, the display medium comprising:

a pair of substrates, at least one of the substrates having transparency and the pair of substrates being arranged to be opposite to each other;

an electrolyte layer which is sandwiched between the pair of substrates and has an electrolyte containing metal ions; and a fine metal particle support which is arranged in the electrolyte layer; wherein the display medium has at least a function that displays an image by depositing fine metal particles containing metal ions from the electrolyte on a surfaces of the fine metal particle support by giving one stimulus to at least one selected from one or more of the pair of substrates and the electrolyte layer, and further wherein the surfaces of the fine metal particle support has pores, and a plurality of the fine metal particles are deposited within the pores.

According to another aspect of the present invention, a display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing the fine metal particles containing metal ions from the electrolyte at at least one location selected from one or more of the substrate surfaces of the pair of substrates that are in contact with the electrolyte layer and the electrolyte layer by giving one stimulus to at least one selected from one or more of the pair of substrates and the electrolyte layer, and another function that dissolves at least some of the fine metal particles, into the electrolyte to display another image by giving another stimulus to the location at which at least the fine metal particles are deposited, wherein at least one of the one stimulus and the other stimulus is given by the stimulator, and the particle size distribution of the fine metal particles, from the fine metal particles deposited in the electrolyte, that are deposited at a specific area, has one or more maximum peaks, and at least one of the maximum peaks satisfies the following formula (1), $$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

According to another aspect of the present invention, a display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing fine metal particles containing metal ions from the electrolyte on at least one of the pair of substrate surfaces that are in contact with the electrolyte layer, by giving one stimulus to at least one selected from at least one or more of the pair of substrates and the electrolyte layer, and another function that dissolves at least some of the fine metal particles into the electrolyte to display another image by giving another stimulus to the substrate surface on which the fine metal particles are deposited, at least one of the one stimulus and the other stimulus is given by the stimulator, and the substrate surface on which the fine metal particles are deposited has pores, and a plurality of the fine metal particles are deposited within the pores.

According to another aspect of the present invention, a display device, the display device comprising:

a pair of substrates, at least one of the substrates having transparency and the pair of substrates being arranged to be opposite to each other;

an electrolyte layer, that is sandwiched between the pair of substrates and has an electrolyte containing metal ions;

a fine metal particle support that is arranged in the electrolyte layer, and a stimulator, wherein the display device has a function that displays an image by depositing fine metal particles containing metal ions from the electrolyte on a surface of the fine metal particle support by giving one stimulus to at least one selected from one or more of the pair of substrates and the electrolyte layer, and a function that dissolves the fine metal particles into the electrolyte to display another image by giving another stimulus to a surfaces of the fine metal particle support on which at least the fine metal particles are deposited, at least one of the one stimulus and the other stimulus is given by the stimulator, and the surfaces of the fine metal particle supports have pores, and a plurality of the fine metal particles are deposited within the pores.

BRIEF DESCRIPTION OF THE DRAWINGS

Preferred embodiments of the present invention will be described in detail based on the following figures, wherein.

DETAILED DESCRIPTION (Display Method)

Figure 1:
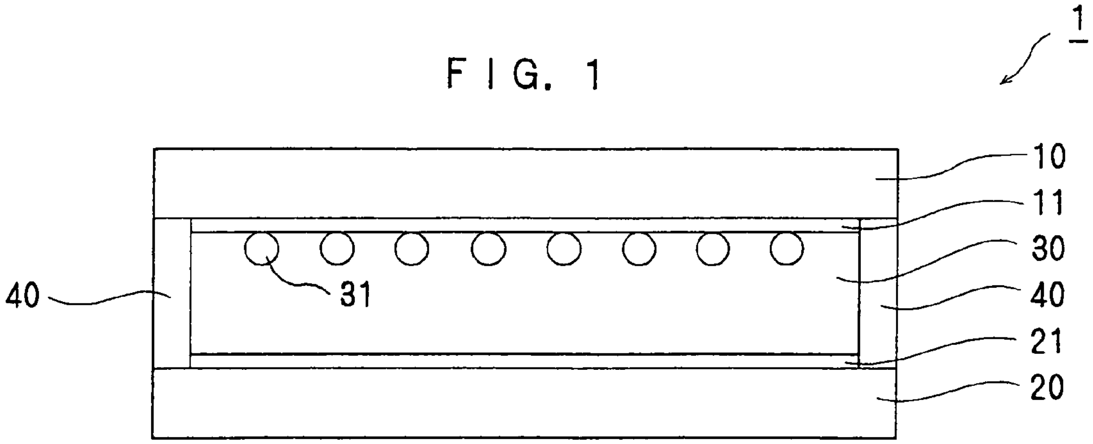
FIG. 1 is a schematic sectional view showing one example of a display medium in the present invention.

The display method of the first invention is a display method that displays an image through a process for depositing fine metal particles, in which the fine metal particles containing metal ions are deposited on a solid surface from an electrolyte containing the metal ions by giving one stimulus to the electrolyte, wherein:

the particle size distribution of the fine metal particles, from all of the fine metal particles deposited from the electrolyte, that are deposited on a specific area of the solid surface, has one or more maximum peaks, and at least one of the maximum peaks satisfies the following formula (1), $$Pp(\pm 30)/Pp(T) \leqq 0.5 \qquad (1)$$

where, Pp(T) means the height of the highest peak among the maximum peaks, and Pp(±30) means the height of the distribution curve at the particle size that is ±30% from the particle size of the fine metal particles at the height of the highest peak.

In the display method of the invention, one image is displayed by using the color due to surface plasmon resonance of fine metal particles deposited on a solid surface. In order to show color due to surface plasmon resonance, the particle size of metal fine particles is, though depending on the kind of the metal composing this fine metal particles, preferably in the range from 1 to 100 nm of the particle size in the height of the highest peak among the maximum peaks, and more preferably in the range from 3 to 70 nm. When the particle size is out of this range, the deposition of fine metal particles does not lead to color due to surface plasmon resonance and there may be some cases where color display can not be carried out.

On the other hand, the coloration wavelength in color due to surface plasmon resonance depends on the particle size of the fine metal particles, for example, in cases where the fine metal particles are composed of Au, they are colored in red when the particle size is around 15 nm, and colored in blue when the particle size is around 45 nm. Accordingly, when only the fine metal particles having the particle size within the range of the predetermined particle size are selectively deposited in the specific area of the solid surface, it is considered that a specific color display can be carried out on the desired position of the solid surface. The inventors have devoted themselves to examine the method in consideration of this respect to find that the particle size distribution of the fine metal particles deposited in the specific area of the solid surface should be controlled so as to meet the following formula (1):

$$Pp(\pm 30)/Pp(T) \leqq 0.5 \qquad (1)$$

where, Pp(T) means the height of the highest peak among the maximum peaks, and Pp(±30) means the height of the distribution curve at the particle size that is ±30% from the particle size of the fine metal particles at the height of the highest peak.

Moreover, the inventors found the following second display method of the invention as a method of capability to carry out the same image display as the first display method of the invention.

That is, the second display method of the invention is a display method that displays an image through the process for depositing fine metal particles in which the fine metal particles containing metal ions are deposited on a solid surface from an electrolyte containing the above-mentioned metal ions by giving one stimulus. The display method is characterized in that the above-mentioned solid surface has pores and the above-mentioned fine metal particles are deposited within the above-mentioned pores.

In the second display method of the invention, one image is displayed by depositing fine metal particles within the pores of the solid surface. Here, because the particle size of the fine metal particles to be deposited within the pores does not become greater than the pore size, when the solid surface having the predetermined pore size and pore size distribution is utilized, the color display with high coloration density can be realized without using a color filter.

In order to obtain the color display with high coloration density without using a color filter, the pore size distribution of the pores existing in the specific area of the solid surface has one or more maximum peaks and at least any one of the above-mentioned maximum peaks preferably meets the following formula (2):

$$Ps(\pm 30)/Ps(T) \leqq 0.5 \qquad (2)$$

where, Ps(T) means the height of the highest peak among the maximum peaks, and Ps(±30) means the height of the distribution curve at the pore size that is ±30% from the pore size of the pores at the height of the highest peak.

In the second display method of the invention, the fine metal particles to be deposited from the electrolyte are deposited within the pores existing in the solid surface. For this reason, controlling the pore size distribution existing in the specific area of the solid surface will lead to automatically controlling the particle size distribution of the fine metal particles to be deposited within the pores. Accordingly, though the pore size distribution is important in order to make color display possible, from the same viewpoint as the above-mentioned first display method of the invention, the inventors have found that the pore size distribution in the solid surface is extremely desirable to meet the above-mentioned formula (2).

Further, though the pores may not only be located in the neighborhood of the solid surface but continue to the solid interior, the fine metal particles deposited within the pores existing in the deep part of the solid interior are difficult to contribute to coloration. Therefore, without reference to whether the pores continue to the solid interior or not, the parameter shown in the above-mentioned formula (2), "Ps(±30)/Ps(T)" denotes a value to be derived based on the pore size of the pores in the neighborhood of the solid surface. Though such neighborhood of the solid surface cannot be strictly defined, it means the range from the highest part in the solid surface to the depth of around the same degree as the maximum diameter of the fine metal particles to be deposited within the pores.

Using the display method of the invention as described hereinbefore, color display can be carried out without using a color filter as the conventional display method using an electrolyte that is shown in JP-A No. 2000-338528. Therefore, since a color filter is not needed, the display method of the invention can control the deteriorations of the resolution and the contrast that are bad effects in case of using a color filter.

On the other hand, in the methods shown in JP-A Nos. 2004-18549 and 2004-198451 in which the combination of an electrolyte and light irradiation is utilized, color display can be carried out similarly to the display method of the invention.

However, from the properties of (1) the color of this visible light is colored by irradiating visible light and is decolorized by irradiating white light, (2) the control of the particle size and particle size distribution of silver particles existing on the surface of a multicolored photochromic material is not particularly considered, and (3) further, in case of being used as an optical multicolored (hole burning) memory material, a number of information can be written in at plural wavelengths, the particle size of silver particles existing on the surface of the multicolored photochromic material is considered to be various (that is, the particle size distribution is extremely broad). And, the coloration mechanism in this case is estimated that among all fine silver particles within the area where light has been irradiate, only the fine silver particles being consisted of the specific particle size (in other words, the fine silver particles that absorb light with the specific wavelength) are dissolved and light with the wavelength corresponding to the particle size of the dissolved fine silver particles is reflected to be shown coloration.

This means that among all fine silver particles existing in the area where light has been irradiated, that is, the area that can be colored, the rate of the fine silver particles that are actually contributable to show coloration is a few. As a result, it is considered to be difficult to assure sufficient coloration density.

In contrast to this, in the display methods of the invention, because only the fine metal particles having narrow particle size distribution (that is, the fine metal particles corresponding to the specific coloration wavelength) are selectively deposited on the specific area of the solid surface, sufficient coloration density can be easily obtained by making the concentration of deposited fine metal particles to be high. In the second display method of the invention, the concentration of deposited fine metal particles can be the desired value by controlling the pore density per unit area in the solid surface.

Here, in the first invention, though Pp(±30)/Pp(T), which is a parameter that means the particle size distribution of fine metal particles, is needed to be 0.5 or less as shown in formula (1), it is more preferable to be 0.4 or less, and further preferable to be 0.3 or less. That is, the fine metal particles are preferable to be near monodisperse. In cases where the value of Pp(±30)/Pp(T) exceeds 0.5, since the particle size distribution of the fine metal particles to be deposited becomes too broad, the color tone of coloration may become indistinct and only the monotone display may become possible to be carried out.

Besides, in the second invention, Ps(±30)/Ps(T), which is the parameter that means the pore size distribution of pores, is preferable to be 0.5 or less as shown in formula (2), more preferable to be 0.4 or less, and further preferable to be 0.3 or less. That is, the pores are preferable to be near monodisperse. In cases where the value of Ps(±30)/Ps(T) exceeds 0.5, since the particle size distribution of the fine metal particles to be deposited within the pores becomes too broad, there are some cases where the color tone of coloration may become indistinct and only the monotone display may become possible to be carried out.

On the other hand, in the invention, though the specific area in the solid surface may be the whole area where fine metal particles can be deposited in the solid surface, usually may be a part of the whole area where fine metal particles can be deposited.

Here, in the first invention, in cases where the particle size distribution of the fine metal particles deposited in the specific area in the solid surface has only one maximum peak, since only one of specific colors can be shown, it is difficult to carry out multicolored and richly expressive color display.

However, in the first display method of the invention, through controlling the particle size distribution and the average particle size of the fine metal particles to be deposited in the specific area as shown in the first display mode and the second display mode shown below, it is also possible to carry out multicolored and richly expressive color display.

That is, the first display mode is a method for controlling the particle size distribution of fine metal particles so that the particle size distribution of the fine metal particles deposited in the specific area in the solid surface has two or more maximum peaks and each of the maximum peaks meets the formula (1). In the first display method, the color display of more than secondary color is possible.

And, the second mode is a method that divides the specific area into further plural areas (hereinafter, it may be referred to as "unit area"). In concrete terms, the method is such a method in which the specific area contains two or more unit area, each of the maximum peak in the particle size distribution of the fine metal particles deposited in one unit area and the maximum peak in the particle size distribution of the fine metal particles deposited in other unit area is one, and the average particle size of the fine metal particles deposited in the above-mentioned one unit area is different from the average particle size of the fine metal particles deposited in the above-mentioned other unit area.

In the second display mode, for example, the specific area is divided into plural unit areas so as to correspond to the pixel corresponding to RGB. And then, multicolored color display can be achieved through controlling the average particle size of the fine metal particles to be deposited in the unit area corresponding to R so as to correspond to red color, controlling the average particle size of the fine metal particles to be deposited in the unit area corresponding to G so as to correspond to green color, and controlling the average particle size of the fine metal particles to be deposited in the unit area corresponding to B so as to correspond to blue color.

As a metal comprising the fine metal particles (corresponding to a metal ion to be deposited from the electrolyte), Au and Ag are preferably used. However, for example, when a color display is carried out with the second method shown as the above-mentioned concrete example, in case of using the fine metal particles comprising of Au, red color can be shown by controlling the average particle size to be around 15 nm, green color by controlling to be around 35 nm, and blue color by controlling to be around 45 nm.

However, the unit area is not always necessary to correspond to a pixel as described above. The unit area may comprise plural pixels as necessary, and the area and shape in one unit area may be equal to those in other unit area or different from them.

On the other hand, in the invention, since the size of the fine metal particles as a coloring source is around several tens nm, the size of the unit area can be made small in the second display method. Consequently, for example, it is also possible to carry out an image display with extremely high resolution of around 300 to 600 dpi.

In order to carry out a more richly expressive color display, the first display mode and the second display mode may be combined.

The first display mode and the second display mode that are described above can be applied to the second display method of the invention by considering the pore size distribution of the pores in place of the particle size distribution of the fine metal particles.

Further, in the invention, the measurement of the particle size distribution and average particle size of the fine metal particles within the specific area (or the unit area) and of the pore size distribution and average pore size of the solid surface within the specific area (or the unit area) can be carried out as follows.

The average particle size and particle size distribution of the fine metal particles can be obtained by analyzing the image of the solid surface where the fine metal particles are deposited, which image has been photographed in 100,000 magnification times using a scanning electron microscope (FE-SEM, trade name: S-5500, manufactured by Hitachi, Ltd.), with an image analysis apparatus (trade name: ROUZEX AP, manufactured by Nicole, Co., Ltd.). The number of the fine metal particles sampled for the image analysis is 100 pieces. As the average particle size, a circle equivalent diameter converted from the area is used.

Moreover, the average particle size and particle size distribution of the fine metal particles deposited within the pores or the pore size distribution and average size of the pores in the solid surface can be obtained by observing the particles existing in the pores, which were obtained by cutting (destroying) the solid surface, in the same way as the description above.

Though one stimulus for depositing the fine metal particles (hereinafter, it may be referred to as "deposition stimulus") is not particularly limited as long as it can give energy to metal ions in an electrolyte in one way or another, in the invention, an electric current, light, or ultrasonic waves are preferably used, and especially an electric current is more preferably used. Or, plural stimuli such as light, electricity, and ultrasonic waves may be given.

Though the display method of the invention may be a display method with which only one-time display can be carried out, it is particularly preferable to be such a display method with which rewriting can be repeated. That is, it is preferable for the display method of the invention to display another image through the process for dissolving fine metal particles in which at least a part of all the fine metal particles deposited from an electrolyte is dissolved into the electrolyte by giving with another stimulus.

Though another stimulus (hereinafter, it may be referred as "dissolution stimulus") is not particularly limited as long as it can give energy to fine metal particles in one way or another, in the invention, an electric current, light, or further ultrasonic waves as necessary can be used, and especially an electric current is more preferably used.

Moreover, the kind of the deposition stimulus and the kind of the dissolution stimulus may be different or the same.

Further, "the kinds of the stimuli are different" means that the stimulus modes as energy are different (that is, the difference of whether being an electric current, or light, or an ultrasonic wave), and of course does not mean the difference of the strength of the stimulus (for example, small and large of voltage, small and large of luminance of light, and the like), and also does not mean the polarity of the stimulus (voltage is positive or negative, and the like), the wavelength and frequency of the stimulus (the wavelength of light, the frequency of an ultrasonic wave, and the like), and the like.

On the other hand, in the conventional techniques as shown in JP-A Nos. 2000-338528, 2005-92183, 2004-18549, 2004-198451, 2003-131339, and 2003-170627, only either of an electric field or irradiation of light can be used as a part (stimulus) for controlling a display. That is, because a part for writing, rewriting, and elimination of image information is limited to one kind, a display medium can not be utilized in such various forms utilizing two kinds or more stimuli that, for example, after writing and rewriting of image information are electrically performed, the display medium is set in a copying machine in place of a copy manuscript and exposed to the strong light source of the copying machine to eliminate the image information. However, in the display method of the invention, it is also possible to make the kind of a deposition stimulus and the kind of a dissolution stimulus to be different.

Moreover, because in the display method of the invention, various kinds of deposition stimuli and dissolution stimuli can be used for displaying, the display method of the invention has also such a merit that high degree of freedom can be obtained in designing a display medium.

In addition, the deposition of fine metal particles is a phenomenon that happens in such a process that metal ions in an electrolyte are reduced to deposit as fine metal particles when a deposition stimulus is given, and the dissolution of fine metal particles is a phenomenon that happens in such a process that metals contained in an electrolyte are oxidized to dissolve into the electrolyte as metal ions when a dissolution stimulus is given. Here, the deposition and the dissolution can be controlled by suitably selecting the kind of a stimulus to be given, the strength, the polarity, the wavelength and frequency, and others. For example, in case of using an electric current as a deposition stimulus and a dissolution stimulus, the deposition and the dissolution can be controlled by making the polarities of the stimuli to be different for each case.

Moreover, as for the deposition stimulus, two kinds or more stimuli can be combined and given at substantially the same time, and the dissolution stimuli can also be treated in the same manner. As such a mode as two kinds or more stimuli are combined and given at substantially the same time, the mode of using the main stimulus for roughly controlling the deposition and dissolution of fine metal particles and the assistant stimulus for performing their subtle control of being difficult only with the main stimulus at the same time is preferable. Here, an electric current is cited as the main stimulus, and the assistant stimuli to be used with an electric current include light (particularly UV light), ultrasonic waves, and heat.

Next, the method for controlling the average particle size and particle size distribution of the fine metal particles to be deposited in the specific area in the solid surface from an electrolyte in the first method of the invention will be described.

As the methods for controlling the particle size distribution and average particle size of fine metal particles, when being divided roughly, the following three kinds of methods can be cited. Two kinds or more of these methods can be combined and used for controlling.

First of all, as the first controlling method, a method that utilizes a solid surface in which pores having a predetermined average pore size and a predetermined pore size distribution are prepared is cited. In concrete terms, the second display method of the invention can be used. And, a solid surface having such pores as to be amorphous and/or continuously connected like being composed of fibers and needle-shaped materials may be utilized. In the latter case, the particle size distribution and average particle size of the fine metal particles can be controlled through adjusting the sizes and shapes of gaps formed between individual fibers and needle-shaped materials by controlling the thickness, density, oriented states and the like of the fibers and the needle-shaped materials.

As the second controlling method, a method of adjusting the conditions for giving the deposition stimulus can be cited. For example, when the deposition stimulus is an ultrasonic wave, the particle size and particle size distribution of the fine metal particles can be controlled by the adjustment of the frequency or strength of the ultrasonic wave. While, when it is light, the particle size and particle size distribution of the fine metal particles can be controlled by the adjustment of the wavelength of the light to be irradiated.

As the third controlling method, a method of adjusting the composition of the electrolyte can be cited. Though the electrolyte to be used in the invention is not particularly limited as long as it contains metal ions that will constitute the fine metal particles to be deposited on the solid surface, it may contain other components such as a surfactant as necessary. Consequently, though the composition of the electrolyte depends on the kind, conditions for giving, and the like of the deposition stimulus, after selecting a system that metal ions in the electrolyte are easily deposited as particles, the particle size and particle size distribution of the fine metal particles can be controlled by optimizing the composition so as to give the desired particle size and particle size distribution.

While, in the second display method of the invention, the particle size distribution and average particle size of the fine metal particles are controlled by the adjustment of the pore size distribution and average size of the pores in the solid surface.

Here, the pore size distribution and average size of the pores existing in the solid surface can be adjusted to be the desired values by suitably selecting the known method according to the material constituting the solid surface. For example, when the solid surface is an anodic oxide film of aluminum, the anodic oxidation condition may be controlled, and when the surface is ceramic such as titanium oxide, the production condition of common porous ceramics may be optimized.

Further, in the display method of the invention, the material, the shape and the function that constitutes the solid surface are not particularly limited as long as the solid surface does not deteriorate or corrode with an electrolyte or by being given any stimuli and can hold the fine metal particles stably in the same position until the fine metal particles once deposited from the electrolyte dissolve into it again.

However, in cases where an electric current is used as the deposition stimulus and/or the dissolution stimulus, the solid surface needs to have the electrode function. In this case, when a reductive reaction is taken place on the solid surface by applying an electric current to the electrolyte through the solid surface, fine metal particles are deposited, and when an oxidation reaction is taken place on the solid surface, the fine metal particles deposited on the solid surface are dissolved.

Moreover, when light is used as the deposition stimulus and/or the dissolution stimulus, the solid surface is necessary to have a photocatalytic function. Further, the photocatalytic function means a function of reducing metal ions in an electrolyte to deposit fine metal particles and/or a function of oxidizing fine metal particles (metals constituting the particle) to dissolve the metals. In this case, through irradiating light over the solid surface, when a reductive reaction is taken place on the solid surface, fine metal particles are deposited, and when an oxidation reaction is taken place, the fine metal particles deposited on the solid surface are dissolved.

As described above, in cases where the deposition stimulus and the dissolution stimulus are an electric current or light, in order to deposit fine metal particles on a solid surface and to dissolve the fine metal particles once deposited, the solid surface is necessary to have an electrode function and a photocatalytic function to convert electric energy or optical energy obtained by giving stimuli into chemical energy for causing an oxidation reaction or a reductive reaction to happen.

On the other hand, in cases where the deposition stimulus is an ultrasonic wave, a high temperature and high pressure cavity is formed as a sonochemical field in an electrolyte when an ultrasonic wave is applied, and metal ions are reduced by the energy in the cavity, resulting in the deposition of the metal fine particles.

Though the color display is considered to be difficult when fine metal particles are deposited randomly and uniformly regardless of the location in the solid surface and in the electrolyte, since the energy of the ultrasonic wave becomes the strongest near the solid surface by being reflected on the solid surface, the metal fine particles are usually deposited on the solid surface (when the solid surface has pores, within the pores) selectively and preferentially. Consequently, in case of using an ultrasonic wave as the deposition stimulus, the frequency and strength of the ultrasonic wave are preferably selected so that the fine metal particles are deposited only on the solid surface and not deposited in the electrolyte.

Further, in order to be dissolved, the fine metal particles can be oxidized and dissolved by giving light or an electric current.

(Display Medium)

Next, the display medium of the invention will be described. As for the display medium of the invention, the composition is not particularly limited as long as the display method of the invention is used. However, in concrete terms, the display medium is preferable to have the following composition.

—The Display Medium Utilizing the First Display Method of the Invention—

First, the display medium utilizing the first display method of the invention will be described.

In this case, the display medium of the invention is preferably equipped at least with a pair of substrates in which at least one substrate has transparency and is arranged to be opposite to the other substrate and with an electrolyte layer that is sandwiched between the pair of substrates and has an electrolyte containing metal ions, the display medium has at least the function that displays an image by depositing the above-mentioned fine metal particles containing metal ions from the above-mentioned electrolyte in at least any area selected from at least one of the substrate surfaces of the above-mentioned one pair of substrates which are in contact with the above-mentioned electrolyte layer and from the above-mentioned electrolyte layer by giving one stimulus to at least any one selected from at least one of the above-mentioned pair of substrates and the above-mentioned electrolyte layer, among all of the fine metal particles deposited from the above-mentioned electrolyte, the particle size distribution of the fine metal particles deposited in the specific area has one or more maximum peaks, and at least any one of the above-mentioned maximum peaks satisfies the above-mentioned formula (1) (hereinafter, it may be referred to as "the display medium in the, first mode").

Here, though fine metal particles can be deposited on at least one of the surfaces of the one pair of the substrates which are in contact with an electrolyte (hereinafter, it may be referred to as "the substrate surface") and/or in the electrolyte, in case of depositing in the electrolyte, fine metal particle supports are arranged in the electrolyte and the fine metal particles to be deposited from the electrolyte are preferably held on the surface of the metal fine particle supports. In this case, as the fine metal particle support, though a dedicated member may be used, partitioning walls equipped between one pair of the substrates so as to divide the electrolyte into two or more cells, spacer particles to be prepared for keeping the distance between one pair of the substrates constantly, and the like can also be utilized.

Further, in the following description, though the side of one pair of substrates that is in contact with an electrolyte layer may be referred to as "the substrate surface", in cases where the member such as a thin film or particles is further prepared on the side of the member (base material) constituting the substrate body, on which side the electrolyte layer is prepared, so as to cover the surface of the substrate, "the substrate surface" means not the surface of the substrate but the surface of the member that is prepared on the surface of the substrate and is in contact with the electrolyte layer.

—The Display Medium Utilizing the Second Display Method of the Invention—

Next, the display medium utilizing the second display method of the invention will be described.

In this case, the display medium of the invention is preferably equipped at least with a pair of substrates that at least one substrate has transparency and is arranged to be opposite to the other substrate and with an electrolyte layer that is sandwiched between the pair of substrates and has an electrolyte containing metal ions, the display medium has at least the function that displays an image by depositing the above-mentioned fine metal particles containing metal ions from the above-mentioned electrolyte on at least one of the substrate surfaces of the above-mentioned one pair of substrates which are in contact with the above-mentioned electrolyte layer by giving one stimulus to at least any one selected from at least one of the above-mentioned pair of substrates and from the above-mentioned electrolyte layer, and the substrate surface on which the above-mentioned fine metal particles are deposited has pores, in addition, the above-mentioned fine metal particles are deposited within the above-mentioned pores (hereinafter, it may be referred to as "the display medium in the second mode").

Further, it is more preferable that in the display medium in the second mode, the pore size distribution of the pores existing in the specific area of the substrate surface, on which the fine metal particles are deposited, has one or more maximum peaks, and at least any one of the above-mentioned maximum peaks meets the following formula (2):

$$Ps(\pm30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

Moreover, in cases where the display medium of the invention, which utilizes the second display method of the invention, has fine metal particle supports in the electrolyte layer, the display medium of the invention is preferably equipped at least with a pair of substrates in which at least one substrate has transparency and is arranged to be opposite to the other substrate, an electrolyte layer that is sandwiched between the pair of substrates and has an electrolyte containing metal ions, and the fine metal particle supports that are arranged in the above-mentioned electrolyte layer, the display medium has at least the function that displays an image by depositing the above-mentioned fine metal particles containing metal ions from the above-mentioned electrolyte on the surfaces of the above-mentioned fine metal particle supports by giving one stimulus to at least any one selected from at least one of the above-mentioned pair of substrates and from the above-mentioned electrolyte layer, and the surfaces of the above-mentioned fine metal particle supports have pores, in addition, the above-mentioned fine metal particles are deposited within the above-mentioned pores (hereinafter, it may be referred to as "the display medium in the third mode").

Further, it is more preferable that in the display medium in the third mode, the pore size distribution of the pores existing in the specific area of the surfaces of the fine metal particle supports has one or more maximum peaks, and at least any one of the above-mentioned maximum peaks meets the above-mentioned formula (2).

—Basic and Common Composition—

The display medium of the invention may be any of the display mediums in the first to third modes as described above and may be one that two kinds or more of these display mediums is combined.

Moreover, though the display medium of the invention may be a display medium with which only one-time display can be carried out, such a display medium with which rewriting can be repeated is particularly preferable. In this case, the display medium of the invention preferably has the function that dissolves the fine metal particles into the electrolyte to display another image by giving another stimulus to at least a part of the area (the substrate surface and/or the surface of the fine metal particle support) on which the fine metal particles have been deposited.

In case of giving another stimulus (the dissolution stimulus) to at least a part of the area on which the fine metal particles have been deposited, since only the fine metal particles existing only within the area that the dissolution stimulus has been given can be selectively deposited, more richly expressive color display can be carried out. The methods of performing such a selective dissolution include, for example, the instance that in case of using an electric current as the dissolution stimulus, the electrodes are set so as to correspond to the pixel on the solid surface, and the instance that in case of using light as the dissolution stimulus, light is selectively irradiated at least one part of the area where the fine metal particles have been deposited.

Further, in order to carry out various and richly expressive color displays, as described above, the first display mode and the second display mode can be utilized.

Next, the electrolyte to be used in the invention will be described. Though the electrolyte to be used in the invention is not particularly limited as long as it contains metal ions for depositing fine metal particles and a solvent, various kinds of materials can be used as necessary.

First, as for metal ions, though well known metal ions can be utilized as long as the metal ions are at least not only reduced by giving the deposition stimulus to deposit fine metal particles but after once being reduced to metals, the metal particles are oxidized by giving the dissolution stimulus to easily dissolve into an electrolyte, in the invention, gold ions and silver ions are preferably used. In addition, though counter ions of the metal ions are not particularly limited as long as the metal ions can stably exist in the ion state in the electrolyte as long as no stimulus is given, these counter ions include fluorine ion, chlorine ion, bromine ion, iodine ion, perchlorate ion, and fluoroborate ion. Moreover, the concentration of metal ions in the electrolyte is preferably within 0.001 to 5 mol/l from the viewpoint of the stability of the electrolyte, the securement of coloration density, the speed of response from the time of giving a stimulus to the time of displaying an image, and the like.

On the other hand, as a solvent, one kind of or two or more kinds in combination of water, alcohols such as methanol, ethanol, and isopropyl alcohol, and other nonaqueous solvents (organic solvents and the like) can be used. And as other additives, water-soluble resins, surfactants, electrolytes other than metal ions (to be deposited as fine metal particles), fine polymer particles, fine metal oxide particles, and the like can be suitably utilized. A solvent is used to dissolve an electrolyte, to dissolve or disperse a polymer, and to dissolve or disperse a surfactant and the like.

Nonaqueour solvents include, for example, ethylene carbonate, propylene carbonate, butylene carbonate, dimethyl carbonate, diethyl carbonate, ethyl methyl carbonate, methyl acetate, ethyl acetate, ethyl propionate, dimethyl sulfoxide, γ-butyrolactone, dimethoxyethane, diethoxyethane, tetrahydrofuran, formamide, dimethylformamide, diethylformamide, dimethylacetamide, acetonitrile, propionitrile, and methylpyrrolidone, and aprotic nonaqueous solvents include silicone oils.

As resins, polyalkylene oxides such as polyethylene oxide, polyalkyleneimines such as polyethyleneimine, polymers such as polyethylene sulfide, polyacrylate, polymethyl methacrylate, polyvinylidene fluoride, polycarbonate, polyacrylonitrile, and polyvinyl alcohol may be used separately or in combination. Dissolving or dispersing in a solvent will contribute to the control of the moving velocity of metal ions and electrolyte ions and to the stabilization of deposited fine metal particles. The amount of addition is adjusted from the relation to the kind of a surfactant and the amount of its addition.

A surfactant will contribute to the stabilization of deposited fine metal particles and to the control of the particle size of deposited particles. The particle size can be controlled to be small by increasing the amount of a surfactant added.

A surfactant can be selected from cationic surfactants (alkylamine salt, quaternary ammonium salt, and the like), nonionic surfactants (polyoxyethylene alkylether, polyoxyalkylene alkylether, polyoxyethylene derivatives, sorbitan fatty acid ester, polyoxyethylene sorbitan fatty acid ester, polyoxyethylene sorbitol fatty acid ester, glycerine fatty acid ester, polyoxyethylene fatty acid ester, polyoxyethylene hardened caster oil, polyoxyethylene alkylamine, alkylalkanolamide, and the like), anionic surfactants (alkylsulfuric ester, polyoxyethylene alkylether sulfuric ester, alkyl benzene sulfonate, alkylnaphthalenesulfonate, alkylsulfosuccinate, alkyldiphenylether disulfonate, fatty acid salt, polycarboxylic acid type high-molecular surfactant, sodium salt of aromatic sulfonic acid and formalin condensate, sodium salt of β-naphthalenesulfonic acid and formalin condensate, and the like), amphoteric surfactants, and the like.

As organic fine particles, various kinds of polymer particles can be used. For example, urethane fine particles, polymethacrylate, silicone polymer fine particles, fluoropolymer fine particles, and the like can be used. These particles are preferably cross-linked. The particle size of these particles is 0.001 μm to 30 μm, and preferably 0.001 μm to 10 μm.

Inorganic fine particles that can be used include fine particles containing aluminum oxide, silicon dioxide, magnesium carbonate, calcium carbonate, titanium dioxide, or barium titanate as a main component. The particle size of these particles is 0.001 μm to 30 μm, and preferably 0.001 μm to 10 μm. The surfaces of these particles are preferably treated with a finishing agent such as a silane coupling agent and a titanate coupling agent for the purpose of dispersibility into a solvent and protection from a solvent. These fine particles are used as white pigment, that is, indicates white in the display medium.

Spacer particles are preferably put to ensure the predetermined distance between the electrodes. As a result, it becomes possible to keep always the constant distance between the electrodes for any external stimulus, and a stable display performance can be obtained. These particle sizes are 1 μm to 200 μm, and preferably 3 μm to 100 μm. The particle size distribution is preferably narrow, and more preferably monodisperse. Color is light-colored, and more preferably white. As a material, the above-mentioned polymer fine particles or silicon dioxide is preferable. The surfaces of these particles are preferably treated with a finishing agent such as a silane coupling agent and a titanate coupling agent for the purpose of dispersibility into a solvent and protection from a solvent.

Ionic compounds of gold and silver include chloroauric acid, sodium chloroaurate, gold sodium thiosulfate, gold sodium chloride, sodium gold sulfite, silver halide, and silver nitrate.

Moreover, an electrolyte may be like a gel. Through making an electrolyte like a gel, the electrolyte is easily prevented from flow out or leak outside the display medium even when a part of the display medium is damaged. In order to make the electrolyte like a gel, water-soluble resins and the like can be utilized.

The material, the shape and the function that constitutes the solid surface (the substrate surface and/or the surfaces of the fine metal particle supports to be arranged into an electrolyte) on which fine metal particles are deposited are not particularly limited as long as the solid surface is not deteriorated and corroded with the electrolyte and by giving any stimulus as described above and can hold the fine metal particles stably in the same position until the fine metal particles once deposited from the electrolyte dissolve into it again. In order to give an electrode function on the solid surface, well known conductive materials including, for example, metals such as gold, platinum, silver, aluminum, copper, chromium, cobalt, and palladium, conductive ceramics such as ITO (Indium Tin Oxide), and conductive polymers such as polyphenylvinylene, polyacetylene, polypyrrole, and polyaniline can be used.

Moreover, in order to give a photocatalytic function to the solid surface, photocatalyst materials such as titanium oxide and silver supported titanium oxide can be used.

On the other hand, in cases where the solid surface has pores, as materials that constitute the solid surface in the display medium of the first mode, well known materials having nanometer-scale pores including a film obtained by anodizing aluminum as already described, zeolite, porous glass, activated carbon fibers, nanoporous silicon, nanoporous organic resins, nanoporous titanium oxide, fullerene, FSM-16 mesoporous silica, alumina, silica gel, hydroxyapatite, clay, and molecular shieves can be utilized. Among those materials, it is suitable to utilize such materials as have the pore size distribution meeting the formula (2).

On the other hand, in the display mediums of the second mode and the third mode, among materials described above, it is particularly preferable to utilize such materials as have the pore size distribution meeting the formula (2).

Moreover, the shape of the solid surface preferably has concavity and convexity to lower the dependence on the viewing angle. Further, the concavity and convexity may be formed through forming the solid surface with particulate matter. The size of concavity and convexity is 1 μm or less, preferably 0.5 μm or less, and more preferably 0.3 μm or less.

Though the color of the solid surface is not particularly limited, white color is preferable. As a result, an image to be displayed in the state of dissolving the fine metal particles can be made white.

Further, the solid surface may be formed with two or more kinds of porous particles so that not only the solid surface has pores but concavity and convexity are formed on the solid surface. In cases where the substrate surface is formed with two or more kinds of porous particles, for example, when porous particles each kind of which has the predetermined average pore size so as to correspond to pixel of each RGB (or a unit area) are used, there is a merit that the production of the display medium becomes easy as compared to the case where the substrate surface is not formed with two or more kinds of porous particles.

In the electrolyte layer, spacer particles may be arranged to keep the thickness of the electrolyte layer constant. As spacer particles, such particles can be utilized that have the particle size nearly equal to the thickness of the electrolyte layer (generally about 1 to 200 μm) and are consisted of a material that is not corroded and deteriorated with the electrolyte and by giving any stimulus. As a material that constitutes the spacer particles, resins, glass, and the like can be utilized.

On at least one of the substrate surfaces of one pair of the substrates that are in contact with the electrolyte layer and/or in the electrolyte layer, metal ion supports that will support metal ions in the electrolyte may be prepared as necessary. For example, when fine metal particles are intended to deposit on the substrate surface, the concentration of metal ions near the substrate surface can be increased through arranging metal ion supports on the substrate surface. As a result, the deposition of fine metal particles can be accelerated when the deposition stimulus is given and the speed of response can be increased in case of displaying an image. Further, the metal ion support is used to keep the high concentration of metal ions in the electrolyte, therefore, zeolite, ion-exchange resins, and the like can be utilized as a metal ion support.

Moreover, partitioning walls may be equipped between one pair of the substrates so as to divide the electrolyte layer into two or more cells. In this case, though each cell formed by the partitioning walls is preferable to correspond to the pixel and the unit area because controlling of deposition and dissolution becomes easy to carry out for every pixel and unit area, it may not correspond to the pixel and the unit area. By equipping the partitioning wall, the flowing out and leakage of the electrolyte fall only in the damaged area when a part of the display medium is damaged, so that the partial damage will not lead to the loss of the function of all the display medium.

Moreover, the display medium of the invention is preferable to have flexibility. In this case, the display medium of the invention becomes easier to be utilized in applications such as electronic paper and portable electronics devices where flexibility is needed. In cases where the display medium of the invention is used in such applications, it is particularly desirable to use substrates having flexibility as a pair of substrates. As such a substrate, for example, a plastic substrate can be used.

Moreover, as a pair of substrates, when a substrate with transparency is used in at least one side, various materials can be utilized. As a substrate having transparency, though well known transparent plastic substrates and glass substrates and the like can be utilized, a substrate with high visible light transmissiveness is preferable.

Next, when at least one side of the deposition stimulus and the dissolution stimulus to be used for displaying an image is an electric current (an electric field mode) and is light (a light mode), more preferable constitution of the display mediums of the invention will be described for each mode.

—An Electric Field Mode—

When the display medium of the invention is an electric field mode, a pair of electrodes is equipped so that an electric current can be applied to the electrolyte.

In this case, out of the surfaces of the pair of substrates, both surfaces that are in contact with the electrolyte layer are preferable to be electrodes. As a member for constituting the electrode on the substrate having transparency, those containing transparent conductive materials such as ITO is preferable. And, the shape of the electrode toward the substrate surface is not particularly limited and may be prepared continuously toward the substrate surface, but the shape is preferably patterned so as to correspond to every pixel (or unit area).

On the other hand, when the particle size distribution and average particle size of the fine metal particles to be deposited are controlled with the pores on the solid surface, at least one of the substrate surfaces that are in contact with the electrolyte layer is preferably an electrode having pores. In this case, the electrode having pores may contain two or more porous conductive particles to lower the dependence on the viewing angle.

Porous conductive particles include, for example, conductive titanium oxide, zinc oxide, and tin oxide, in addition, the particle size is preferably within the range of 0.05 to 100 μm and the surface is preferably white.

—A Light Mode—

When the display medium of the invention is a light mode, there is a photocatalyst substance having at least one phorocatalytic function selected from a photocatalytic function in which metal ions are reduced by light irradiation and the fine metal particles are deposited and from a photocatalytic function in which the metal fine particles are oxidized and dissolved. And the photocatalyst substance is contained in at least any area selected from either of the substrate surfaces of the one pair of substrates that are in contact with the electrolyte layer and from the electrolyte layer. When the photocatalyst substance is contained in the electrolyte layer, the photocatalyst substance is sufficient to be contained in at least the surfaces of the fine metal particle supports.

Moreover, when the particle size distribution and average particle size of the fine metal particles to be deposited are controlled with the pores in the solid surface, at least one side of the substrate surfaces that are in contact with the electrolyte layer and the surfaces of the fine metal particle supports are preferable to have a photocatalytic function and to have the photocatalyst substance with pores in the surface. Further, the substrate surface having a photocatalytic function and containing the photocatalyst substance having pores in the surface may contain two or more porous conductive particles to lower the dependence on the viewing angle.

In addition, as porous photocatalyst particles, for example, titanium oxide and the like can be cited. The particle size is preferably within the range of 0.05 to 100 μm and the surface is preferably white.

—A Part for Giving a Stimulus and a Display Medium (a Display Element) with the Part Thereof, and an External Stimulus—

The display medium of the invention can utilize a stimulus given from the outside of the display medium (hereinafter, it may be referred to as "an external stimulus") as the deposition stimulus or the dissolution stimulus in case of writing/rewriting/eliminating an image. However, because something outside the display medium must be utilized as a source for giving a stimulus, sometimes it is difficult to write/rewrite/eliminate an image in arbitrary timing, resulting in lacking convenience. Accordingly, the display medium of the invention may be provided with a part for giving a stimulus for giving at least one of the deposition stimuli and the dissolution stimulus to be used for displaying an image (hereinafter, the display medium provided with the part for giving a stimulus may be referred to as "a display device").

Moreover, in cases where the display device of the invention can display repeatedly and has only the part for giving a stimulus that can give one stimulus out of the deposition stimulus and the dissolution stimulus, a stimulus given from the outside of the display element (the display device) (hereinafter, it may be referred to as "an external stimulus") can be utilized as another stimulus. Of course, though the display device of the invention can display repeatedly and has the part for giving a stimulus that gives both of the deposition stimulus and the dissolution stimulus, the display device may be able to write/rewrite/eliminate an image by also utilizing an external stimulus. And, in the display medium having no part for giving a stimulus, an external stimulus is utilized as the deposition stimulus or the dissolution stimulus.

Further, the display device of the invention may be provided with two kinds of parts for giving a stimulus. In this case, the kind of a stimulus given by one part for giving a stimulus may be different from the kind of a stimulus given by another part for giving a stimulus.

As a part for giving a stimulus in cases where the deposition stimulus and the dissolution stimulus to be utilized for displaying an image are an electric current, a battery, a solar battery, and the like can be utilized. As a part for giving a stimulus in cases where the deposition stimulus and the dissolution stimulus to be utilized for displaying an image are light, various light sources such as LED can be utilized. In cases where the deposition stimulus and the dissolution stimulus to be utilized for displaying an image are an ultrasonic wave, a piezoelectric element and the like can be utilized.

Moreover, in cases where an external stimulus is an electric current, an external power source like an outlet can be utilized. However, in this case, the display medium needs to be provided with a terminal and the like that can connect to an electrode and an external power source so as to utilize an external power source.

In cases where an external stimulus is light, all kinds of light sources can be utilized in principle. However, when being considered that the light sources are utilized under a general irradiation environment, the display medium of the invention preferably not easily occur spontaneously the rewriting or eliminating of an image display even when being exposed to indoor lighting and sunlight. And it is preferable that the display medium can write, rewrite, or eliminate only when being exposed to a specific light source, for example, a light source giving off light with a specific wavelength like lasers, or a light source having stronger irradiation intensity than indoor lighting and sunlight.

—Concrete Examples of the Display Medium—

Next, the display medium of the invention will be described more concretely using drawings.

FIG. 1 is a schematic sectional view showing one example of the display medium of the invention and shows the display medium of an electric field mode. In FIG. 1, 1 indicates a display medium, 10 a transparent substrate, 11 a transparent electrode, 20 a substrate, 21 an electrode, 30 an electrolyte, and 40 a sealing member.

The display medium 1 shown in FIG. 1 contains the transparent substrate 10, the substrate 20 that is arranged oppositely at a constant interval to the transparent substrate 10, the electrolyte 30 filled up between the transparent substrate 10 and the substrate 20, the sealing members 40 prepared at the both ends of the surface of the transparent substrate 10 in the direction toward the substrate to prevent the leakage of the electrolyte 30 filled up between the transparent substrate 10 and the substrate 20, the transparent electrode 11 arranged on the surface of the transparent substrate 10 in the side where the electrolyte 30 is located, and the electrode 21 arranged on the surface of the substrate 20 in the side where the electrolyte 30 is located. In cases where the substrate 20 is a metal, the electrode 21 may be unnecessary when occasion demands. That is, it is when the substrate 20 plays the role of the electrode 21. Further, the transparent electrode 11 and the electrode 21 are connected to the power sources not shown in the figure.

In cases where the display medium 1 shown in FIG. 1 utilizes the second display method of the invention that displays an image by depositing fine metal particles within the pores on the solid surface, a porous conductive material having pores on the surface is arranged on the surface of the transparent electrode 11 so as to be contacted and kept (not shown in the figure). As these porous materials, for example, a particulate material can be arranged on the surface of the transparent electrode 11 in layers.

In the display medium 1 shown in FIG. 1, an image is displayed by applying an electric current to the electrolyte 30 through the transparent electrode 11 and the electrode 21. When the transparent electrode 11 side is set to be negative and the electrode 21 side is positive and then an electric current is applied so that the reductive reaction of metal ions in the electrolyte 30 are occurred on the surface of the transparent electrode 11, the fine metal particles 31 are deposited on the surface of the transparent electrode 11 and one image is displayed. Next, when an electric current is applied inversely, the fine metal particles 31 are dissolved and another image is displayed.

Moreover, the transparent electrode 11 may contain plural divided electrodes so as to control deposition and dissolution every pixel (or unit area). Further, the surface of the transparent electrode 11 may have pores having such pore size distribution so as to meet the formula (2), when containing plural electrodes as mentioned above, pixels corresponding to RGB can be formed by making the average size of pores on one electrode and the average size of pores on other electrode different. In addition, the color of the surface of the electrode 21 may be white in order to carry out a display with white solid color when all of the fine metal particles 31 existing in the surface of the transparent electrode 11 are dissolved.

Though in the display medium 1 shown in FIG. 1, the fine metal particles 31 are drawn large so that plural particles having a nearly equal particle size are located on the flat surface of the transparent electrode 11 in order to make the description easy, the actual deposition form of the fine metal particles 31 is not always limited to the deposition form shown in FIG. 1. This is similarly applied to the drawings described below.

Figure 2:
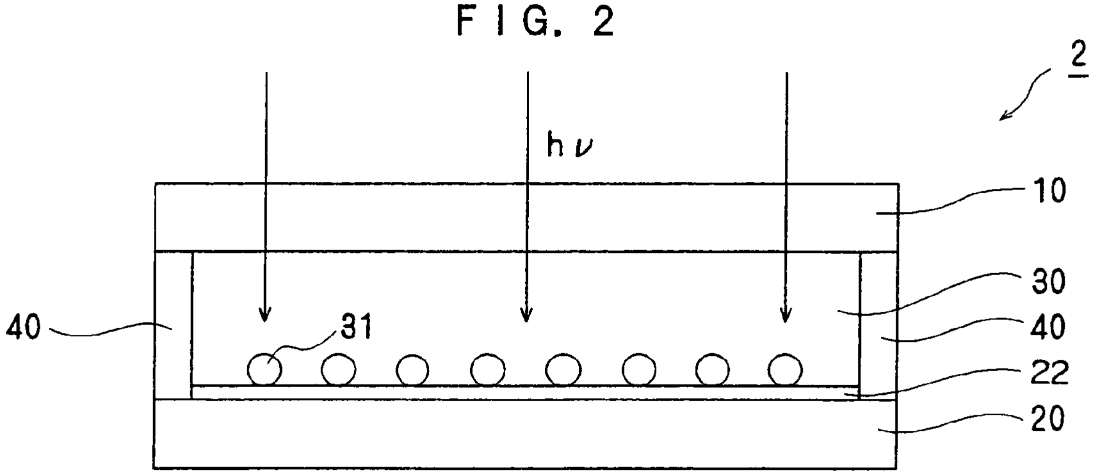
FIG. 2 is a schematic sectional view showing other example of a display medium in the invention.

FIG. 2 is a schematic sectional view showing other example of the display medium of the invention and shows the display medium of a light mode. In FIG. 2, 2 indicates a display medium and 22 indicates a photocatalyst substance layer, and the same numbers are given to the members common to the members shown in FIG. 1.

The display medium 2 shown in FIG. 2 contains the transparent substrate 10, the substrate 20 that is arranged oppositely at a constant interval to the transparent substrate 10, the electrolyte 30 filled up between the transparent substrate 10 and the substrate 20, the sealing members 40 prepared at the both ends of the surface of the transparent substrate 10 in the direction toward the substrate to prevent the leakage of the electrolyte 30 filled up between the transparent substrate 10 and the substrate 20, and the photocatalyst substance layer 22 arranged on the surface of the substrate 20 in the side where the electrolyte 30 is located.

In the display medium 2 shown in FIG. 2, an image is displayed by irradiating light over the surface of the photocatalyst substance layer 22 through the layer on which transparent substrate 10 and the electrolyte 30 are located from the side on which the transparent substrate 10 of the display medium 2 is located.

For example, in cases where the photocatalyst substance layer 22 has both of the function of reducing metal ions and the function of oxidizing fine metal particles depending on the wavelength of the light to be irradiated, the reductive reaction is occurred with the photocatalyst substance layer 22 by irradiating the light with one wavelength band and the fine metal particles 31 are deposited on the surface of the photocatalyst substance layer 22 to display one image, while the oxidation reaction is occurred with the photocatalyst substance layer 22 by irradiating the light with another wavelength band and the fine metal particles 31 are dissolved to display another image.

Further, the surface of the photocatalyst substance layer 22 may have pores having the pore size distribution such as to meet the formula (2), and the average size of pores in one area in the surface of the photocatalyst substance layer 22 may be different from the average size of pores in other area.

Figure 3:
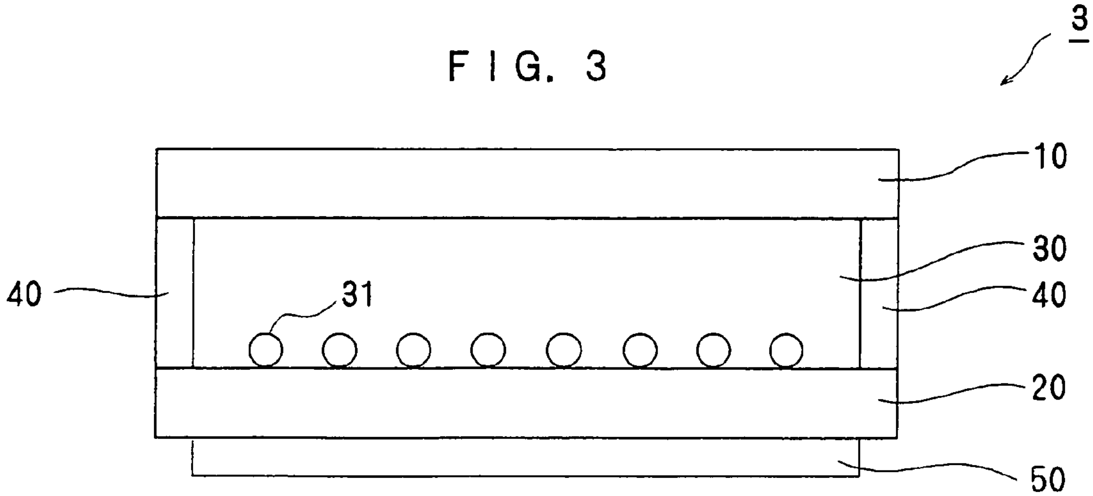
FIG. 3 is a schematic sectional view showing another example of a display medium in the invention.

FIG. 3 is a schematic sectional view showing another example of the display medium of the invention and shows the display medium of an ultrasonic wave mode. In FIG. 3, 3 indicates a display medium and 50 indicates a piezoelectric element, and the same numbers are given to the members common to the members shown in FIG. 1.

The display medium 3 shown in FIG. 3 is consisted of the transparent substrate 10, the substrate 20 that is arranged oppositely at a constant interval to the transparent substrate 10, the electrolyte 30 filled up between the transparent substrate 10 and the substrate 20, the sealing members 40 prepared at the both ends of the surface of the transparent substrate 10 in the direction toward the substrate to prevent the leakage of the electrolyte 30 filled up between the transparent substrate 10 and the substrate 20, and the piezoelectric element 50 arranged on the surface opposite to the surface of the substrate 20 in the side where the electrolyte 30 is located.

In the display medium 3 shown in FIG. 3, an image is displayed by applying an ultrasonic wave to the whole display medium 3 with the piezoelectric element 50. In this case, because the strength of the ultrasonic wave near the surface of the substrate 20 becomes the strongest in the layer being consisted of the electrolyte 30, the fine metal particles 31 are selectively deposited only on the surface of the substrate 20 in the side where the electrolyte 30 are located by suitably selecting the frequency and strength of the ultrasonic wave and one image can be displayed.

Next, in the display mediums as shown in FIGS. 1 to 3, one mode of the deposition state of the fine metal particles deposited on the substrate surface by giving the deposition stimulus will be described using drawings.

Figure 4:
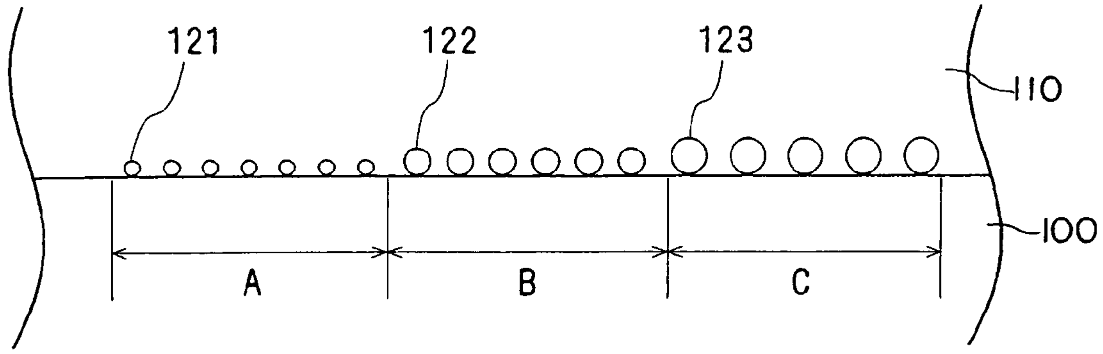
FIG. 4 is a schematic sectional view showing one aspect of the deposition state of metal fine particles that are deposited on a substrate surface.

FIG. 4 is a schematic sectional view showing one mode of the deposition state of the fine metal particles deposited on the substrate surface. In FIG. 4, 100 indicates the substrate, 110 indicates the electrolyte, and each of 121, 122, and 123 indicate a fine metal particle. In FIG. 4, the surface of the substrate 100 is divided into three areas (unit areas) shown by A, B, and C, and the fine metal particles 121 with the smallest average particle size are deposited in the area A, the fine metal particles 122 with the larger average particle size than that in the fine metal particles 121 are deposited in the area B, and the fine metal particles 123 with the larger average particle size than that in the fine metal particles 122 are deposited in the area C, respectively. Moreover, each of the particle size distributions of the fine metal particles 121, the fine metal particles 122, and the fine metal particles 123 deposited in these three areas meet the formula (1), and the average particle sizes of the three kinds of the fine metal particles correspond to any of the particle sizes in which color due to surface plasmon resonance is possible at any wavelength within the visible range, respectively.

Figure 5:
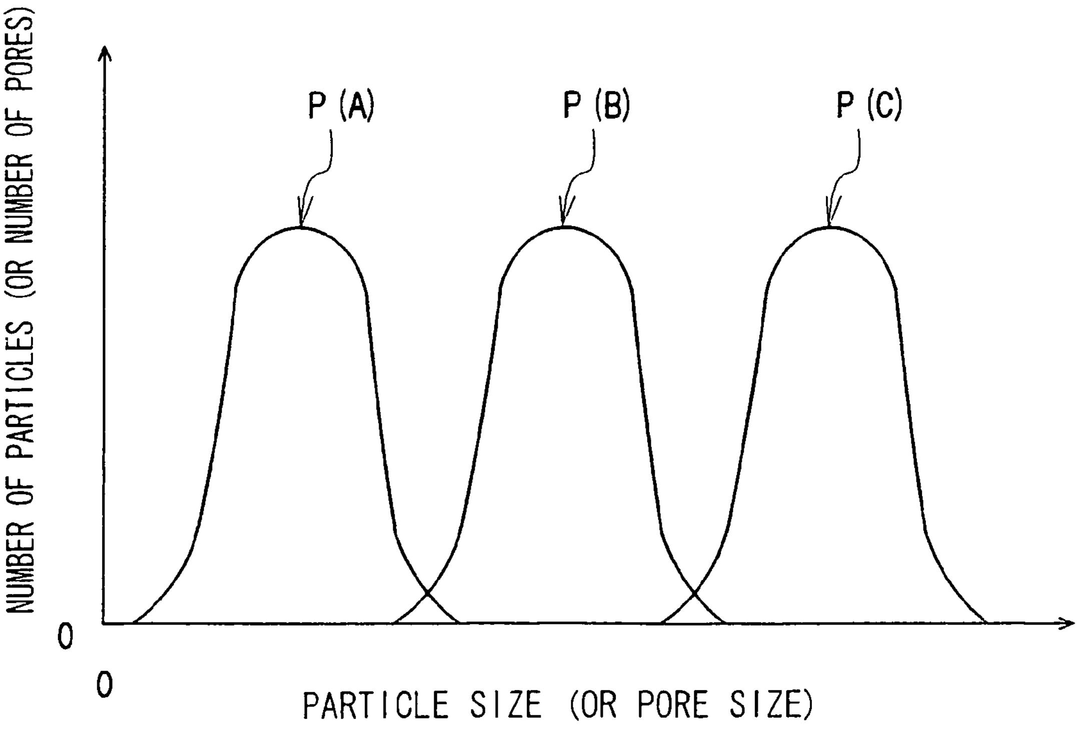
FIG. 5 is a graph showing one example of the particle size distribution profiles of fine metal particles 121, fine metal particles 122, and fine metal particles 123 that are deposited, respectively, on the area A, B, and C shown in FIG. 4.

FIG. 5 is a graph showing one example of profiles of the particle size distributions of the fine metal particles 121, the fine metal particles 122, and the fine metal particles 123 that are deposited in the areas A, B, and C shown in FIG. 4, respectively. In FIG. 5, the maximum peak shown as P (A) indicates the profile of the particle size distribution of the fine metal particles 121 deposited in the area A, the maximum peak shown as P (B) indicates the profile of the particle size distribution of the fine metal particles 122 deposited in the area B, and the maximum peak shown as P (C) indicates the profile of the particle size distribution of the fine metal particles 123 deposited in the area C.

As shown in FIG. 5, the particle sizes in the highest peaks of the profiles of the particle size distributions corresponding to each area (that is, the particle size corresponds to approximately the average particle size) are greatly separated, and in addition, the profiles of the particle size distributions are not very overlapped each other.

Here, in cases where a large number of pixels that are consisted of a set of three unit areas A, B, and C that have the profiles of the particle size distribution as shown in FIG. 5 are prepared on the surface of the substrate 100 and the deposition and dissolution can be controlled every unit area, since the profile of the particle size distribution corresponding to each area meets the formula (1), bright and richly tonal various image displays can be carried out.

Further, when the surface of the substrate 100 shown in FIG. 4 has pores, the three profiles of the particle size distributions corresponding to each of the three unit areas A, B, and C shown in FIG. 5 can be replaced with the profiles of the pore size distributions of the pores within the unit areas A, B, and C, respectively.

In this case, each of the pore size distributions preferably meets the formula (2).

Some embodiments of the invention are outlined below.

According to an aspect of the invention, a display method that displays an image through a process for depositing fine metal particles, in which the fine metal particles containing metal ions are deposited on a solid surface from an electrolyte containing the metal ions by giving one stimulus to the electrolyte, wherein:

the particle size distribution of the fine metal particles, from all of the fine metal particles deposited from the electrolyte, that are deposited on a specific area of the solid surface, has one or more maximum peaks, and at least one of the maximum peaks satisfies the following formula (1), $$Pp(\pm 30)/Pp(T) \leqq 0.5 \qquad (1)$$

where, Pp(T) means the height of the highest peak among the maximum peaks, and Pp(±30) means the height of the distribution curve at the particle size that is ±30% from the particle size of the fine metal particles at the height of the highest peak.

Another image may be displayed through a process for dissolving the fine metal particles, in which at least some of the fine metal particles from all the fine metal particles deposited from the electrolyte may be dissolved into the electrolyte by giving another stimulus.

The specific area may contain two or more unit areas, there may be a single maximum peak in each of the particle size distribution of the fine metal particles deposited in one unit area and the particle size distribution of the fine metal particles deposited in another unit area, and the average particle size of the fine metal particles deposited in the one unit area may be different from the average particle size of the fine metal particles deposited in the other unit areas.

The fine metal particles may show color due to surface plasmon resonance.

The solid surface may have pores, and the pore size distribution of the pores existing in the specific area may have one or more maximum peaks, at least one of the maximum peaks may satisfy the following formula (2), and a plurality of the fine metal particles may be deposited within the pores, $$Ps(\pm 30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

The specific area may contain two or more unit areas, there may be a single maximum peak in each of the pore size distribution of the pores existing in one unit area and in the pore size distribution of the pores existing in another unit areas, and the average size of the pores existing in the one unit area may be different from the average size of the pores existing in the other unit area.

The one stimulus may be at least one selected from an electric current and light.

The other stimulus may be at least one selected from an electric current and light.

The one stimulus may be different from the other stimulus.

The solid surface may have an electrode function, and at least one of either the deposition of the fine metal particles from the electrolyte and/or the dissolution of the fine metal particles into the electrolyte may be carried out by applying an electric current to the electrolyte through the solid surface.

The solid surface may have a photocatalytic function, and at least one of either the deposition of the fine metal particles from the electrolyte and/or the dissolution of the fine metal particles into the electrolyte may be carried out by irradiating light onto the solid surface.

According to another aspect of the invention, a display method that displays an image through a process for depositing fine metal particles, wherein fine metal particles containing metal ions are deposited on a solid surface from an electrolyte containing the metal ions by giving one stimulus to the electrolyte, the solid surface has pores, and a plurality of the fine metal particles are deposited within the pores.

The particle size distribution of the fine metal particles, from all of the fine metal particles deposited in the electrolyte, that are deposited on a specific area of the solid surface, may have one or more maximum peaks; and at least one of the maximum peaks may satisfy the following formula (1), $$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

Another image may be displayed through a process for dissolving fine metal particles, in which at least some of the fine metal particles from all the fine metal particles deposited from the electrolyte may be dissolved into the electrolyte by giving another stimulus.

The fine metal particles may show color due to surface plasmon resonance.

The pore size distribution of the pores existing in the specific area of the solid surface may have one or more maximum peaks, and at least one of the maximum peaks may satisfy the following formula (2), $$Ps(\pm 30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

According to another aspect of the invention, a display medium, the display medium comprising:

at least a pair of substrates, at least one of the substrates having transparency and the pair of substrates being arranged to be opposite to each other; and an electrolyte layer, which is sandwiched between the pair of substrates and has an electrolyte containing metal ions, wherein the display medium has at least a function that displays an image by depositing fine metal particles containing metal ions from the electrolyte at at least one location selected from one or more of the pair of substrate surfaces that are in contact with the electrolyte layer and within the electrolyte layer by giving one stimulus to at least one selected from one or more of the pair of substrates and the electrolyte layer, and further wherein the particle size distribution of the fine metal particles from all of the fine metal particles deposited from the electrolyte, that are deposited in a specific area, has one or more maximum peaks, and at least one of the maximum peaks satisfies the following formula (1), $$Pp(\pm 30)/Pp(T) \leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

The display medium may further have a function of dissolving at least some of the fine metal particles, from at least one part of the areas at which the fine metal particles may be deposited, into the electrolyte to display another image by giving another stimulus.

A fine metal particle support may be arranged in the electrolyte layer and fine metal particles deposited in the electrolyte may be held on the surface of the fine metal particle support.

The specific area may contain two or more unit areas, there may be a single maximum peak in each of the particle size distribution of the fine metal particles deposited in one unit area and the particle size distribution of the fine metal particles deposited in another unit area, and the average particle size of the fine metal particles deposited in the one unit area may be different from the average particle size of the fine metal particles deposited in the other unit area.

The fine metal particles may show color due to surface plasmon resonance.

The fine metal particles may be deposited on at least one of the substrate surfaces of the pair of substrates which may be in contact with the electrolyte layer;

the substrate surface on which the fine metal particles are deposited may have pores; and the pore size distribution of the pores existing in the specific area of the substrate surface, on which the fine metal particles are deposited, may have one or more maximum peaks, and at least one of the maximum peaks may satisfy the following formula (2), and the plurality of the fine metal particles may be deposited within the pores, $$Ps(\pm 30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

The specific area may contain two or more unit areas, there may be a single maximum peak in each of the pore size distribution of the pores existing in one unit area and the pore size distribution of the pore size distribution of the pores existing in another unit area, and the average size of the pores existing in the one unit area may be different from the average size of the pores existing in the other unit area.

A fine metal particle support may be arranged in the electrolyte layer, the fine metal particles may be deposited on the surface of the fine metal particle support, and the surfaces of the fine metal particle support may have pores, the pore size distribution of the pores existing in a specific area of the surface of the fine metal support having one or more maximum peaks, wherein at least one of the maximum peaks may satisfy the following formula (2), and a plurality of the fine metal particles may be deposited within the pores, $$Ps(\pm 30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

The specific area may contain two or more unit areas, there may be a single maximum peak in each of the pore size distribution of the pores existing in one unit area and the pore size distribution of the pores existing in another unit area, and the average size of the pores existing in the one unit area may be different from the average size of the pores existing in the other unit area.

The metal ions may be at least one selected from gold ions and silver ions.

The electrolyte may be a gel.

The electrolyte layer may contain spacer particles.

A metal ion support holding the metal ions may be provided in at least one location selected from one or more of the pair of substrate surfaces that are in contact with the electrolyte layer and within the electrolyte layer.

Partitioning walls may be provided between the pair of substrates to divide the electrolyte layer into two or more cells.

The display medium may have flexibility.

The fine metal particles may be deposited on at least one of the pair of substrate surfaces that are in contact with the electrolyte layer, and the substrate surface on which the fine metal particles may be deposited is substantially white.

The fine metal particles may be deposited on at least one of the pair of substrate surfaces that are in contact with the electrolyte layer, and the substrate surface on which the fine metal particles may be deposited has irregularities thereon.

The fine metal particles may be deposited on a surface of the fine metal particle support, and the surface of the fine metal particle support may be substantially white.

The fine metal particles may be deposited on a surface of the fine metal particle support, and the surface of the fine metal particle support may have irregularities thereon.

The one stimulus may be at least one selected from an electric current and light.

The other stimulus may be at least one selected from an electric current and light.

The one stimulus may be different from the other stimulus.

At least one of the one stimulus and the other stimulus may be an electric current, and both the pair of substrate surfaces that are in contact with the electrolyte layer may be electrodes.

At least one of the one stimulus and the other stimulus may be an electric current and both the pair of substrate surfaces that are in contact with the electrolyte layer may be electrodes, at least one being an electrode having pores.

The electrode having pores may be comprised of two or more porous conductive particles.

At least one of the one stimulus and the other stimulus may be light, at at least one location selected from one or more of the pair of substrate surfaces that are in contact with the electrolyte layer and within the electrolyte layer, the display medium may contain a photocatalyst substance having at least one photocatalytic function selected from a photocatalytic function in which by light irradiation the metal ions may be reduced to deposit the fine metal particles and the photocatalytic function in which by light irradiation the fine metal particles may be oxidized to be dissolved.

At least one of the one stimulus and the other stimulus may be light, and at least one of the pair of substrate surfaces that are in contact with the electrolyte layer may contain a photocatalyst substance having pores on the surface thereof and may have at least one photocatalytic function selected from a photocatalytic function in which by light irradiation the metal ions may be reduced to deposit the fine metal particles and a photocatalytic function in which by light irradiation the fine metal particles may be oxidized to be dissolved.

The substrate surface, which may have the photocatalytic function and may contain the photocatalyst substance having pores on the surface thereof, may comprise two or more porous catalyst particles.

According to another aspect of the invention, a display medium, the display medium comprising:

at least a pair of substrates, at least one of the substrates having transparency and the pair of substrates being arranged to be opposite to each other; and an electrolyte layer which is sandwiched between the pair of substrates and has an electrolyte containing metal ions, wherein the display medium has at least a function that displays an image by depositing fine metal particles containing metal ions from the electrolyte onto at least one of the pair of substrate surfaces that are in contact with the electrolyte layer by giving one stimulus to at least one selected from one or more of the one pair of substrates and the electrolyte layer, and wherein the substrate surface on which the fine metal particles are deposited has pores, and a plurality of the fine metal particles are deposited within the pores.

The pore size distribution of the pores existing in the specific area of the substrate surface, on which the fine metal particles are deposited, may have one or more maximum peaks, and at least one of the maximum peaks may satisfy the following formula (2), $$Ps(\pm30)/Ps(T)\leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

The display medium may have a further function of dissolving at least some of the fine metal particles, from at least one part of the substrate surface on which the fine metal particles may be deposited, into the electrolyte to display another image by giving another stimulus.

According to another aspect of the invention, a display medium, the display medium comprising:

a pair of substrates, at least one of the substrates having transparency and the pair of substrates being arranged to be opposite to each other;

an electrolyte layer which is sandwiched between the pair of substrates and has an electrolyte containing metal ions; and a fine metal particle support which is arranged in the electrolyte layer; wherein the display medium has at least a function that displays an image by depositing fine metal particles containing metal ions from the electrolyte on a surfaces of the fine metal particle support by giving one stimulus to at least one selected from one or more of the pair of substrates and the electrolyte layer, and further wherein the surfaces of the fine metal particle support has pores, and a plurality of the fine metal particles are deposited within the pores.

A pore size distribution of the pores existing in a specific area of the surface of the fine metal particle support may have one or more maximum peaks, and at least one of the maximum peaks may satisfy the following formula (2), $$Ps(\pm30)/Ps(T)\leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

The display medium may have a further function of dissolving at least some of the fine metal particle, from at least one part of the surfaces of the fine metal particle support on which the fine metal particles may be deposited, into the electrolyte to display another image by giving another stimulus.

According to another aspect of the invention, a display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing the fine metal particles containing metal ions from the electrolyte at at least one location selected from one or more of the substrate surfaces of the pair of substrates that are in contact with the electrolyte layer and the electrolyte layer by giving one stimulus to at least one selected from one or more of the pair of substrates and the electrolyte layer, and another function that dissolves at least some of the fine metal particles, into the electrolyte to display another image by giving another stimulus to the location at which at least the fine metal particles are deposited, wherein at least one of the one stimulus and the other stimulus is given by the stimulator, and the particle size distribution of the fine metal particles, from the fine metal particles deposited in the electrolyte, that are deposited at a specific area, has one or more maximum peaks, and at least one of the maximum peaks satisfies the following formula (1), $$Pp(\pm30)/Pp(T)\leqq 0.5 \quad (1)$$

where, Pp(T) means the height of the highest peak among the maximum peaks, and Pp(±30) means the height of the distribution curve at the particle size that is ±30% from the particle size of the fine metal particles at the height of the highest peak.

According to another aspect of the invention, a display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing fine metal particles containing metal ions from the electrolyte on at least one of the pair of substrate surfaces that are in contact with the electrolyte layer, by giving one stimulus to at least one selected from at least one or more of the pair of substrates and the electrolyte layer, and another function that dissolves at least some of the fine metal particles into the electrolyte to display another image by giving another stimulus to the substrate surface on which the fine metal particles are deposited, at least one of the one stimulus and the other stimulus is given by the stimulator, and the substrate surface on which the fine metal particles are deposited has pores, and a plurality of the fine metal particles are deposited within the pores.

The pore size distribution of the pores existing in a specific area of the substrate surface on which the fine metal particles are deposited may have one or more maximum peaks, and at least one of the maximum peaks may satisfy the following formula (2), $$Ps(\pm30)/Ps(T)\leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

According to another aspect of the invention, a display device, the display device comprising:

a pair of substrates, at least one of the substrates having transparency and the pair of substrates being arranged to be opposite to each other;

an electrolyte layer, that is sandwiched between the pair of substrates and has an electrolyte containing metal ions;

a fine metal particle support that is arranged in the electrolyte layer, and a stimulator, wherein the display device has a function that displays an image by depositing fine metal particles containing metal ions from the electrolyte on a surface of the fine metal particle support by giving one stimulus to at least one selected from one or more of the pair of substrates and the electrolyte layer, and a function that dissolves the fine metal particles into the electrolyte to display another image by giving another stimulus to a surfaces of the fine metal particle support on which at least the fine metal particles are deposited, at least one of the one stimulus and the other stimulus is given by the stimulator, and the surfaces of the fine metal particle supports have pores, and a plurality of the fine metal particles are deposited within the pores.

The pore size distribution of the pores existing in a specific area of the surface of the fine metal particle support may have one or more maximum peaks, and at least one of the maximum peaks may satisfy the following formula (2), $$Ps(\pm 30)/Ps(T) \leqq 0.5 \quad (2)$$

where, Ps(T) means the height of the highest peak among the maximum peaks, and Ps(±30) means the height of the distribution curve at the pore size that is ±30% from the pore size of the pores at the height of the highest peak.

EXAMPLES

Example 1

A display medium having a basic composition as shown in FIG. 1 is manufactured according to the following procedure.

First, a substrate that a porous conductive titanium oxide (titanium oxide, manufactured by Bexcel Corp.) layer is further formed on the surface of ITO electrode on a transparent non-alkali glass substrate (1 mm in thickness, 10 cm×10 cm) on the one side of which ITO film (1.5 μm in film thickness) is prepared as a transparent electrode, and an aluminum substrate (2 mm in thickness, 10 cm×10 cm) are provided.

Further, as a porous conductive titanium oxide film, a film that has the average pore size in the surface of 15 nm and the pore size distribution of about 0.4 in Ps(±30)/Ps(T) is formed. Moreover, in each of the substrates, the outgoing wiring of proper length is connected to the electrode so that an electric current can be applied to the electrode.

Next, after spacers composed of resin particles of about 50 μm in diameter is suitably arranged at proper intervals on the porous conductive titanium oxide layer formed on the glass substrate, the surface of the porous conductive titanium oxide layer formed on the glass substrate is lapped over the aluminum substrate so as to be opposite to each other to produce a layered product. Subsequently, with the exception of a part, the entire circumference of the edge of the layered product is sealed with an UV cure resin (trade name: 3121, manufactured by Three Bond Corp.), and then the resin is cured by irradiating ultraviolet.

Next, after the electrolyte is filled into the layered product from the non-sealed part of the edge of the layered product (the inlet of the electrolyte), the inlet is sealed with the above-mentioned UV cure resin and cured by irradiating ultraviolet rays to manufacture a display medium.

As an electrolyte, a gold salt solution (the concentration of gold ions is 0.03 mol/l) containing the following composition is used.

| | |
|---|---|
| Water: | 100 parts by weight |
| Chloroauric acid: | 1 part by weight |
| Gelatin: | 5 parts by weight |
| Titanium dioxide (the average particle size: 0.2 μm): | 20 parts by weight |
| Lithium bromide: | 2 parts by weight |
| Sodium dodecylbenzenesulfonate: | 0.2 parts by weight |

Next, the aluminum substrate side of this display medium is set positive and the electrode on the glass substrate side is set negative and then the direct-current electricity of 1 V in voltage and 0.1 mA/cm$^2$ in current density is applied to this display medium. Thereupon, vivid and high coloration density red color is displayed on the whole surface of the display medium and it is cleared that a coloration state suitable for displaying a color image is obtained. Subsequently, when an electric current is applied in the reverse polarity, the red color completely dies away.

Further, the display medium is decomposed in the state of being sufficiently colored in red and the part near the surface of the porous conductive titanium oxide layer is cut (destroyed), and then the internal situation is observed and measured with SEM. As a result, it is confirmed that fine metal particles almost equal to the pore size are deposited within almost all the pores and Pp(±30)/Pp(T) is about 0.4.

According to an aspect of the invention, it is possible to provide the display method using an electrolyte with which color display in high coloration density can be carried out without using a color filter, and the display medium and the display device using the method thereof.

Example 2

A display medium is manufactured and evaluated in the same manner as that in Example 1 except for using porous conductive titanium oxide having the average pore size in surface of 15 nm and the pore size distribution of about 0.7 in Ps(±30)/Ps(T) (manufactured by Solaronix Corp.) in place of a porous conductive titanium oxide material to be formed on the surface of a glass substrate in Example 1.

As a result, though red coloration is confirmed, the coloration is lack in vividness and low also in coloration density as compared to those in Example 1. However, it is found that the display of a color image can be carried out.

The display medium is decomposed in the state of being sufficiently colored in red and the part near the surface of the porous conductive titanium oxide film layer is cut (destroyed), and then the internal situation is observed and measured with SEM. As a result, it is confirmed that fine metal particles almost equal to the pore size are deposited within almost all the pores and Pp(±30)/Pp(T) is about 0.7.

Example 3

A display medium is manufactured and evaluated in the same manner as that in Example 1 except for using porous conductive titanium oxide having the average pore size in surface of 45 nm and the pore size distribution of about 0.4 in Ps(±30)/Ps(T) (manufactured by Tayca Corp.) in place of a porous conductive titanium oxide material to be formed on the surface of a glass substrate in Example 1. As a result, vivid and high coloration density blue color is displayed and it is cleared that a coloration state suitable for displaying a color image is obtained.

The display medium is decomposed in the state of being sufficiently colored in blue and the part near the surface of the porous conductive titanium oxide layer is cut (destroyed), and then the internal situation is observed and measured with SEM. As a result, it is confirmed that fine metal particles almost equal to the pore size are deposited within almost all the pores and Pp(±30)/Pp(T) is about 0.4.

Example 4

A display medium is manufactured in the same manner as that in Example 1 except for arranging mesopore silica (FSM-16, 0.03 μm in average particle size, 25 nm in average pore size, and about 0.3 in Ps(±30)/Ps(T), a synthetic compound within Fuji Xerox Co., Ltd.), on which ruthenium polypyridine complex is supported, so as to cover uniformly on ITO film in place of forming porous conductive titanium oxide layer on ITO film prepared on one side of a glass substrate.

When the He—Ne laser beam of 632 nm in wavelength and 5 mW in output power is continuously irradiated to the display medium until coloration becomes sufficiently stable, the area where the laser is irradiated becomes vivid and high coloration density red color and it is cleared that a coloration state suitable for displaying a color image is obtained. Further, compared with the case of applying an electric current as in Examples 1 to 3, time is required until sufficient coloration is obtained. Subsequently, it is confirmed that when the electrode on the glass substrate side is set positive and the aluminum substrate side is set negative and then the direct-current electricity of 2 V in voltage and 0.5 mA/cm$^2$ in current density is applied, the coloration dies away.

The display medium is decomposed in the state of being sufficiently colored by irradiating the laser beam, and then the surface of the part being colored in red of mesopore silica is similarly measured with SEM. As a result, it is confirmed that fine metal particles almost equal to the pore size are deposited within almost all the pores and Pp(±30)/Pp(T) is about 0.3.

Example 5

A display medium is manufactured in the same manner as that in Example 1 except for using a transparent non-alkali glass substrate (1 mm in thickness, 10 cm×10 cm) on which ITO particles (0.1 μm in particle size) are adhered as an electrode so as to cover uniformly on the one side, an aluminum substrate (2 mm in thickness, 10 cm×10 cm) on the one side of which platinum electrode of 100 μm in film thickness is prepared, and a gold salt solution (0.03 mol/l in gold ion concentration) containing the following composition as an electrolyte.

| | |
|---|---|
| Water: | 100 parts by weight |
| Chloroauric acid: | 1 part by weight |
| Gelatin: | 5 parts by weight |
| Titanium dioxide (the average particle size: 0.2 μm): | 20 parts by weight |
| Lithium bromide: | 2 parts by weight |
| Sodium dodecylbenzenesulfonate: | 0.2 parts by weight |

The platinum electrode side of this display medium is set positive and the electrode on the glass substrate side is set negative and then the direct-current electricity of 1 V in voltage and 0.2 mA/cm$^2$ in current density is applied to this display medium. Thereupon, vivid and high coloration density red color is displayed on the whole surface of the display medium and it is cleared that a coloration state suitable for displaying a color image is obtained. Subsequently, when an electric current is applied in the reverse polarity, the red color completely dies away.

The display medium is decomposed in the state of being sufficiently colored in red, and the particles deposited on the glass substrate are observed and measured with SEM. As a result, Pp(±30)/Pp(T) is confirmed to be about 0.3.

Comparative Example

A display medium is manufactured in the same manner as that in Example 1 except that no porous conductive titanium layer is formed on the ITO film prepared on the one side of non-alkali glass substrate.

Next, the electrode on the aluminum substrate side of this display medium is set positive and the electrode on the glass substrate side is set negative and then the direct-current electricity of 1 V in voltage and 0.1 mA/cm$^2$ in current density is applied to this display medium. Thereupon, blackish brown color is displayed on the whole surface of the display medium and it is cleared that no color image can be displayed.

The display medium is decomposed in the state of being sufficiently colored in blackish brown, and the fine metal particles deposited on the surface of the ITO film on the glass substrate side are measured with SEM. As a result, the average particle size is 80 nm and Pp(±30)/Pp(T) is 1.3.

What is claimed is:

1. A display method that displays an image through a process for depositing fine metal particles, in which the fine metal particles containing metal ions are deposited on a solid surface from an electrolyte containing the metal ions by giving one stimulus to the electrolyte, wherein:

the particle size distribution of the fine metal particles, from all of the fine metal particles deposited from the electrolyte, that are deposited on a specific area of the solid surface, has one or more maximum peaks, and at least one of the maximum peaks satisfies the following formula (1), $$Pp(\pm 30)/Pp(T) \leqq 0.5 \quad (1)$$

where, Pp (T) means the height of the highest peak among the maximum peaks, and Pp (±30) means the height of the distribution curve at the particle size that is ±30% from the particle size of the fine metal particles at the height of the highest peak.

2. The display method of claim 1, wherein another image is displayed through a process for dissolving the fine metal particles, in which at least some of the fine metal particles from all the fine metal particles deposited from the electrolyte are dissolved into the electrolyte by giving another stimulus.

3. The display method of claim 1, wherein the specific area contains two or more unit areas, there is a single maximum peak in each of the particle size distribution of the fine metal particles deposited in one unit area and the particle size distribution of the fine metal particles deposited in another unit area, and the average particle size of the fine metal particles deposited in the one unit area is different from the average particle size of the fine metal particles deposited in the other unit areas.

4. The display method of claim 1, wherein the fine metal particles show color due to plasmon resonance.

5. The display method of claim 1, wherein the solid surface has pores, and the pore size distribution of the pores existing in the specific area has one or more maximum peaks, at least one of the maximum peaks satisfies the following formula (2), and a plurality of the fine metal particles are deposited within the pores, $$Ps(\pm30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

6. The display method of claim 5, wherein the specific area contains two or more unit areas, there is a single maximum peak in each of the pore size distribution of the pores existing in one unit area and in the pore size distribution of the pores existing in another unit areas, and the average size of the pores existing in the one unit area is different from the average size of the pores existing in the other unit area.

7. The display method of claim 1, wherein the one stimulus is at least one selected from an electric current and light.

8. The display method of claim 2, wherein the other stimulus is at least one selected from an electric current and light.

9. The display method of claim 2, wherein the one stimulus is different from the other stimulus.

10. The display method of claim 2, wherein the solid surface has an electrode function, and at least one of either the deposition of the fine metal particles from the electrolyte and/or the dissolution of the fine metal particles into the electrolyte is carried out by applying an electric current to the electrolyte through the solid surface.

11. The display method of claim 2, wherein the solid surface has a photocatalytic function, and at least one of either the deposition of the fine metal particles from the electrolyte and/or the dissolution of the fine metal particles into the electrolyte is carried out by irradiating light onto the solid surface.

12. A display method that displays an image through a process for depositing fine metal particles, wherein fine metal particles containing metal ions are deposited on a solid surface from an electrolyte containing the metal ions by giving one stimulus to the electrolyte, the solid surface has pores, a plurality of the fine metal particles are deposited within the pores, the pore size distribution of the pores existing in the specific area of the solid surface has one or more maximum peaks, and at least one of the maximum peaks satisfies the following formula (2), $$Ps(\pm30)/Ps(T) \pm 0.5 \quad (2)$$

where, Ps (T) means the height of the highest peak among the maximum peaks, and Ps (±30) means the height of the distribution curve at the pore size that is ±30% from the pore size of the pores at the height of the highest peak.

13. The display method of claim 12, wherein:

the particle size distribution of the fine metal particles, from all of the fine metal particles deposited in the electrolyte, that are deposited on a specific area of the solid surface, has one or more maximum peaks; and at least one of the maximum peaks satisfies the following formula (1), $$Pp(\pm30)/Pp(T) \leqq 0.5 \quad (1)$$

where, Pp (T) means the height of the highest peak among the maximum peaks, and Pp (±30) means the height of the distribution curve at the particle size that is ±30% from the particle size of the fine metal particles at the height of the highest peak.

14. The display method of claim 12, wherein another image is displayed through a process for dissolving fine metal particles, in which at least some of the fine metal particles from all the fine metal particles deposited from the electrolyte are dissolved into the electrolyte by giving another stimulus.

15. The display method of claim 12, wherein the fine metal particles show color due to surface plasmon resonance.

16. A display medium, the display medium comprising:

at least a pair of substrates, at least one of the substrates having transparency and the pair of substrates being arranged to be opposite to each other; and an electrolyte layer, which is sandwiched between the pair of substrates and has an electrolyte containing metal ions, wherein the display medium has at least a function that displays an image by depositing fine metal particles containing metal ions from the electrolyte at at least one location selected from one or more of the pair of substrate surfaces that are in contact with the electrolyte layer and within the electrolyte layer by giving one stimulus to at least one selected from one or more of the pair of substrates and the electrolyte layer, and further wherein the particle size distribution of the fine metal particles from all of the fine metal particles deposited from the electrolyte, that are deposited in a specific area, has one or more maximum peaks, and at least one of the maximum peaks satisfies the following formula (1), $$Pp(\pm30)/Pp(T) \leqq 0.5 \quad (1)$$

where, Pp (T) means the height of the highest peak among the maximum peaks, and Pp (±30) means the height of the distribution curve at the particle size that is ±30% from the particle size of the fine metal particles at the height of the highest peak.

17. The display medium of claim 16, wherein the display medium further has a function of dissolving at least some of the fine metal particles, from at least one part of the areas at which the fine metal particles are deposited, into the electrolyte to display another image by giving another stimulus.

18. The display medium of claim 16, wherein a fine metal particle support is arranged in the electrolyte layer and fine metal particles deposited in the electrolyte are held on the surface of the fine metal particle support.

19. The display medium of claim 16, wherein the specific area contains two or more unit areas, there is a single maximum peak in each of the particle size distribution of the fine metal particles deposited in one unit area and the particle size distribution of the fine metal particles deposited in another unit area, and the average particle size of the fine metal particles deposited in the one unit area is different from the average particle size of the fine metal particles deposited in the other unit area.

20. The display medium of claim 16, wherein the fine metal particles show color due to surface plasmon resonance.

21. The display medium of claim 16, wherein:

the fine metal particles are deposited on at least one of the substrate surfaces of the pair of substrates which are in contact with the electrolyte layer;

the substrate surface on which the fine metal particles are deposited has pores; and the pore size distribution of the pores existing in the specific area of the substrate surface, on which the fine metal particles are deposited, has one or more maximum peaks, and at least one of the maximum peaks satisfies the following formula (2), and the plurality of the fine metal particles are deposited within the pores, $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

22. The display medium of claim 21, wherein the specific area contains two or more unit areas, there is a single maximum peak in each of the pore size distribution of the pores existing in one unit area and the pore size distribution of the pore size distribution of the pores existing in another unit area, and the average size of the pores existing in the one unit area is different from the average size of the pores existing in the other unit area.

23. The display medium of claim 16, wherein:

a fine metal particle support is arranged in the electrolyte layer, the fine metal particles are deposited on the surface of the fine metal particle support, and the surfaces of the fine metal particle support has pores, the pore size distribution of the pores existing in a specific area of the surface of the fine metal support having one or more maximum peaks, wherein at least one of the maximum peaks satisfies the following formula (2), and a plurality of the fine metal particles are deposited within the pores, $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

24. The display medium of claim 23, wherein the specific area contains two or more unit areas, there is a single maximum peak in each of the pore size distribution of the pores existing in one unit area and the pore size distribution of the pores existing in another unit area, and the average size of the pores existing in the one unit area is different from the average size of the pores existing in the other unit area.

25. The display medium of claim 16, wherein the metal ions are at least one selected from gold ions and silver ions.

26. The display medium of claim 16, wherein the electrolyte is a gel.

27. The display medium of claim 16, wherein the electrolyte layer contains spacer particles.

28. The display medium of claim 16, further comprising a metal ion support holding the metal ions provided in at least one location selected from one or more of the pair of substrate surfaces that are in contact with the electrolyte layer and within the electrolyte layer.

29. The display medium of claim 16, further comprising partitioning walls provided between the pair of substrates to divide the electrolyte layer into two or more cells.

30. The display medium of claim 16, wherein the display medium has flexibility.

31. The display medium of claim 16, wherein the fine metal particles are deposited on at least one of the pair of substrate surfaces that are in contact with the electrolyte layer, and the substrate surface on which the fine metal particles are deposited is substantially white.

32. The display medium of claim 16, wherein the fine metal particles are deposited on at least one of the pair of substrate surfaces that are in contact with the electrolyte layer, and the substrate surface on which the fine metal particles are deposited has irregularities thereon.

33. The display medium of claim 18, wherein the fine metal particles are deposited on a surface of the fine metal particle support, and the surfaces of the fine metal particle support is substantially white.

34. The display medium of claim 18, wherein the fine metal particles are deposited on a surface of the fine metal particle support, and the surface of the fine metal particle support has irregularities thereon.

35. The display medium of claim 16, wherein the one stimulus is at least one selected from an electric current and light.

36. The display medium of claim 17, wherein the other stimulus is at least one selected from an electric current and light.

37. The display medium of claim 17, wherein the one stimulus is different from the other stimulus.

38. The display medium of claim 17, wherein at least one of the one stimulus and the other stimulus is an electric current, and both the pair of substrate surfaces that are in contact with the electrolyte layer are electrodes.

39. The display medium of claim 21, wherein at least one of the one stimulus and the other stimulus is an electric current and both the pair of substrate surfaces that are in contact with the electrolyte layer are electrodes, at least one being an electrode having pores.

40. The display medium of claim 39, wherein the electrode having pores is comprised of two or more porous conductive particles.

41. The display medium of claim 17, wherein at least one of the one stimulus and the other stimulus is light, at at least one location selected from one or more of the pair of substrate surfaces that are in contact with the electrolyte layer and within the electrolyte layer, the display medium contains a photocatalyst substance having at least one photocatalytic function selected from a photocatalytic function in which by light irradiation the metal ions are reduced to deposit the fine metal particles and the photocatalytic function in which by light irradiation the fine metal particles are oxidized to be dissolved.

42. The display medium of claim 21, wherein at least one of the one stimulus and the other stimulus is light, and at least one of the pair of substrate surfaces that are in contact with the electrolyte layer contains a photocatalyst substance having pores on the surface thereof and has at least one photocatalytic function selected from a photocatalytic function in which by light irradiation the metal ions are reduced to deposit the fine metal particles and a photocatalytic function in which by light irradiation the fine metal particles are oxidized to be dissolved.

43. The display medium of claim 42, wherein the substrate surface, which has the photocatalytic function and contains the photocatalyst substance having pores on the surface thereof, comprises two or more porous catalyst particles.

44. A display medium, the display medium comprising:

at least a pair of substrates, at least one of the substrates having transparency and the pair of substrates being arranged to be opposite to each other; and an electrolyte layer which is sandwiched between the pair of substrates and has an electrolyte containing metal ions, wherein the display medium has at least a function that displays an image by depositing fine metal particles containing metal ions from the electrolyte onto at least one of the pair of substrate surfaces that are in contact with the electrolyte layer by giving one stimulus to at least one selected from one or more of the one pair of substrates and the electrolyte layer, the substrate surface on which the fine metal particles are deposited has pores, and a plurality of the fine metal particles are deposited within the pores, and the pore size distribution of the pores existing in the specific area of the substrate surface, on which the fine metal particles are deposited, has one or more maximum peaks, and at least one of the maximum peaks satisfies the following formula (2), $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

45. The display medium of claim 44, wherein the display medium has a further function of dissolving at least some of the fine metal particles, from at least one part of the substrate surface on which the fine metal particles are deposited, into the electrolyte to display another image by giving another stimulus.

46. A display medium, the display medium comprising:

a pair of substrates, at least one of the substrates having transparency and the pair of substrates being arranged to be opposite to each other;

an electrolyte layer which is sandwiched between the pair of substrates and has an electrolyte containing metal ions; and a fine metal particle support which is arranged in the electrolyte layer; wherein the display medium has at least a function that displays an image by depositing fine metal particles containing metal ions from the electrolyte on a surfaces of the fine metal particle support by giving one stimulus to at least one selected from one or more of the pair of substrates and the electrolyte layer, and further wherein the surfaces of the fine metal particle support has pores, and a plurality of the fine metal particles are deposited within the pores, and a pore size distribution of the pores existing in a specific area of the surface of the fine metal particle support has one or more maximum peaks, and at least one of the maximum peaks satisfies the following formula (2), $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

47. The display medium of claim 46, wherein the display medium has a further function of dissolving at least some of the fine metal particle, from at least one part of the surfaces of the fine metal particle support on which the fine metal particles are deposited, into the electrolyte to display another image by giving another stimulus.

48. A display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing the fine metal particles containing metal ions from the electrolyte at at least one location selected from one or more of the substrate surfaces of the pair of substrates that are in contact with the electrolyte layer and the electrolyte layer by giving one stimulus to at least one selected from one or more of the pair of substrates and the electrolyte layer, and another function that dissolves at least some of the fine metal particles, into the electrolyte to display another image by giving another stimulus to the location at which at least the fine metal particles are deposited, wherein at least one of the one stimulus and the other stimulus is given by the stimulator, and the particle size distribution of the fine metal particles, from the fine metal particles deposited in the electrolyte, that are deposited at a specific area, has one or more maximum peaks, and at least one of the maximum peaks satisfies the following formula (1), $$Pp(\pm 30)/Pp(T) \leqq 0.5 \quad (1)$$

where, Pp (T) means the height of the highest peak among the maximum peaks, and Pp (±30) means the height of the distribution curve at the particle size that is ±30% from the particle size of the fine metal particles at the height of the highest peak.

49. A display device, the display device comprising:

a pair of substrates, at least one of the substrates having transparency and the pair of substrates being arranged to be opposite to each other;

an electrolyte layer which is sandwiched between the pair of substrates and has an electrolyte containing metal ions; and a stimulator, wherein the display device has a function that displays an image by depositing fine metal particles containing metal ions from the electrolyte on at least one of the pair of substrate surfaces that are in contact with the electrolyte layer, by giving one stimulus to at least one selected from at least one or more of the pair of substrates and the electrolyte layer, another function that dissolves at least some of the fine metal particles into the electrolyte to display another image by giving another stimulus to the substrate surface on which the fine metal particles are deposited, at least one of the one stimulus and the other stimulus is given by the stimulator, the substrate surface on which the fine metal particles are deposited has pores, and a plurality of the fine metal particles are deposited within the pores, and the pore size distribution of the pores existing in a specific area of the substrate surface on which the fine metal particles are deposited has one or more maximum peaks, and at least one of the maximum peaks satisfies the following formula (2), $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

50. A display device, the display device comprising:

a pair of substrates, at least one of the substrates having transparency and the pair of substrates being arranged to be opposite to each other;

an electrolyte layer, that is sandwiched between the pair of substrates and has an electrolyte containing metal ions;

a fine metal particle support that is arranged in the electrolyte layer, and a stimulator, wherein the display device has a function that displays an image by depositing fine metal particles containing metal ions from the electrolyte on a surface of the fine metal particle support by giving one stimulus to at least one selected from one or more of the pair of substrates and the electrolyte layer, a function that dissolves the fine metal particles into the electrolyte to display another image by giving another stimulus to a surfaces of the fine metal particle support on which at least the fine metal particles are deposited, at least one of the one stimulus and the other stimulus is given by the stimulator, the surfaces of the fine metal particle supports have pores, and a plurality of the fine metal particles are deposited within the pores, and the pore size distribution of the pores existing in a specific area of the surface of the fine metal particle support has one or more maximum peaks, and at least one of the maximum peaks satisfies the following formula (2), $$Ps(\pm 30)/Ps(T) \leqq 0.5 \quad (2)$$

where, Ps (T) means the height of the highest peak among the maximum peaks, and Ps (±30) means the height of the distribution curve at the pore size that is ±30% from the pore size of the pores at the height of the highest peak.

* * * * *